US012409630B2

(12) United States Patent
Wetsch et al.

(10) Patent No.: US 12,409,630 B2
(45) Date of Patent: Sep. 9, 2025

(54) DUNNAGE SYSTEMS WITH AUTOMATED FEEDING CAPABILITY

(71) Applicant: Pregis LLC, Chicago, IL (US)

(72) Inventors: Thomas D. Wetsch, Naples, FL (US); David Joyce, Naperville, IL (US)

(73) Assignee: Pregis LLC, Chicago, IL (US)

(*) Notice: Subject to any disclaimer, the term of this patent is extended or adjusted under 35 U.S.C. 154(b) by 10 days.

(21) Appl. No.: 18/346,123

(22) Filed: Jun. 30, 2023

(65) Prior Publication Data

US 2024/0001639 A1 Jan. 4, 2024

Related U.S. Application Data

(60) Provisional application No. 63/367,600, filed on Jul. 1, 2022.

(51) Int. Cl.
*B31D 5/00* (2017.01)

(52) U.S. Cl.
CPC .... *B31D 5/0052* (2013.01); *B31D 2205/0035* (2013.01); *B31D 2205/0047* (2013.01); *B31D 2205/0058* (2013.01); *B31D 2205/0082* (2013.01); *B31D 2205/0088* (2013.01)

(58) Field of Classification Search
CPC .. B31D 5/0039; B31D 5/0043; B31D 5/0047; B31D 5/0052; B31D 5/006; B31D 2205/0035; B31D 2205/0047; B31D 2205/0058; B31D 2205/0082; B31D 2205/0088; B65H 2801/63
USPC .......................................................... 493/464
See application file for complete search history.

(56) References Cited

U.S. PATENT DOCUMENTS

| | | | | |
|---|---|---|---|---|
| 4,750,896 A * | 6/1988 | Komaransky | B31D 5/0047 | 493/464 |
| 5,105,703 A | 4/1992 | Kondo | | |
| 5,123,889 A * | 6/1992 | Armington | B26D 1/08 | 83/628 |
| 5,203,083 A | 4/1993 | Domonoske | | |
| 5,322,477 A * | 6/1994 | Armington | B26D 5/14 | 493/349 |
| 5,593,376 A * | 1/1997 | Armington | B31D 5/0047 | 493/464 |
| 5,607,383 A * | 3/1997 | Armington | B31D 5/0047 | 493/464 |
| 5,658,229 A * | 8/1997 | Armington | B26D 1/30 | 493/464 |

(Continued)

FOREIGN PATENT DOCUMENTS

| | | |
|---|---|---|
| DE | 10204506 A1 | 8/2003 |
| EP | 1762375 A2 | 3/2007 |

(Continued)

*Primary Examiner* — Dariush Seif
(74) *Attorney, Agent, or Firm* — Fox Rothschild LLP

(57) ABSTRACT

A dunnage conversion machine includes a drive mechanism configured to deform a stock material into a continuous length of dunnage. The machine also includes a cutting device configured to sever a piece of the dunnage from the continuous length of dunnage. The cutting device includes a grip configured to move to a closed position at which the grip exerts a force on the piece of dunnage to retain the piece on the machine until the piece is pulled away from the machine, at which point the grip moves to an open position and the machine advances the continuous length of dunnage to commence another cutting cycle.

22 Claims, 37 Drawing Sheets

(56) References Cited

U.S. PATENT DOCUMENTS

| | | | | | |
|---|---|---|---|---|---|
| 5,674,172 | A * | 10/1997 | Armington | B31D 5/0047 | 493/464 |
| 5,709,642 | A * | 1/1998 | Ratzel | B31D 5/0047 | 493/464 |
| 5,749,539 | A * | 5/1998 | Ratzel | B65H 16/06 | 294/158 |
| 5,803,893 | A * | 9/1998 | Armington | B31D 5/0047 | 248/676 |
| 5,891,009 | A * | 4/1999 | Ratzel | B31D 5/0047 | 493/410 |
| 5,906,569 | A * | 5/1999 | Ratzel | B26D 1/245 | 493/464 |
| 5,908,375 | A * | 6/1999 | Simmons | B31D 5/0047 | 493/464 |
| 5,938,580 | A * | 8/1999 | Siekmann | B31D 5/0047 | 493/464 |
| 5,997,461 | A * | 12/1999 | Armington | B31D 5/0047 | 493/464 |
| 6,033,353 | A * | 3/2000 | Lencoski | B31D 5/0047 | 493/464 |
| 6,080,097 | A | 6/2000 | Ratzel et al. | | |
| 6,135,939 | A * | 10/2000 | Lencoski | B31D 5/0047 | 493/464 |
| 6,168,560 | B1 * | 1/2001 | Pluymaekers | B31D 5/0047 | 493/464 |
| 6,183,586 | B1 * | 2/2001 | Heidelberger | B65D 81/107 | 156/200 |
| 6,277,459 | B1 * | 8/2001 | Lencoski | B65D 81/09 | 428/218 |
| 6,311,596 | B1 | 11/2001 | Ratzel et al. | | |
| 6,398,703 | B1 | 6/2002 | Keller | | |
| 6,402,674 | B1 * | 6/2002 | Simmons, Jr | B65H 23/048 | 493/464 |
| 6,416,451 | B1 * | 7/2002 | Ratzel | B31D 5/0047 | 493/464 |
| 6,468,197 | B1 * | 10/2002 | Lencoski | B31D 5/0047 | 493/464 |
| 6,561,964 | B1 * | 5/2003 | Armington | B31D 5/0047 | 493/464 |
| 7,041,043 | B2 * | 5/2006 | Lucassen | B31D 5/0047 | 493/464 |
| 7,163,503 | B2 * | 1/2007 | Toth | B65H 23/08 | 493/464 |
| 7,186,208 | B2 * | 3/2007 | Demers | B26F 3/02 | 493/967 |
| 7,503,247 | B2 | 3/2009 | Cavanagh | | |
| 7,788,884 | B2 * | 9/2010 | Cheich | B65B 55/20 | 53/238 |
| 7,819,599 | B2 | 10/2010 | Kobayashi et al. | | |
| 7,955,245 | B2 | 6/2011 | Cheich et al. | | |
| 8,419,606 | B2 * | 4/2013 | Carlson | B31D 5/0043 | 493/464 |
| 8,562,229 | B2 | 10/2013 | Inaba et al. | | |
| 8,708,882 | B2 * | 4/2014 | Chan | B31D 5/0047 | 493/464 |
| 9,994,343 | B2 | 6/2018 | Wetsch | | |
| 10,814,578 | B2 * | 10/2020 | Schalk | B31D 5/0043 | |
| 10,926,506 | B2 * | 2/2021 | Wetsch | B31D 5/0039 | |
| 10,940,658 | B2 | 3/2021 | Lemmens | | |
| 11,207,860 | B2 * | 12/2021 | Cheich | B31D 5/0052 | |
| 11,331,873 | B2 * | 5/2022 | Peterlini | B31D 5/0047 | |
| 11,491,756 | B2 * | 11/2022 | Christman | B31D 5/0047 | |
| 2003/0084769 | A1 | 5/2003 | Keller | | |
| 2003/0139272 | A1 * | 7/2003 | Simmons, Jr. | B31D 5/0047 | 493/394 |
| 2007/0199422 | A1 | 8/2007 | Kawaguchi | | |
| 2008/0125301 | A1 * | 5/2008 | Manley | B31D 5/0047 | 493/464 |
| 2009/0082187 | A1 * | 3/2009 | Cheich | B31D 5/0052 | 53/472 |
| 2009/0165625 | A1 | 7/2009 | Ishii et al. | | |
| 2011/0053744 | A1 * | 3/2011 | Wetsch | B31D 5/0052 | 493/464 |
| 2011/0061986 | A1 * | 3/2011 | Orsini | B31D 5/0043 | 192/133 |
| 2011/0281711 | A1 | 11/2011 | Chan et al. | | |
| 2012/0027496 | A1 | 2/2012 | Mochida et al. | | |
| 2012/0053040 | A1 * | 3/2012 | Wetsch | B31D 5/0047 | 493/464 |
| 2013/0255457 | A1 | 10/2013 | Yazawa et al. | | |
| 2013/0272769 | A1 | 10/2013 | Yazawa et al. | | |
| 2014/0155241 | A1 * | 6/2014 | Cheich | B65H 45/04 | 493/405 |
| 2014/0274645 | A1 * | 9/2014 | Wetsch | B65H 35/04 | 493/360 |
| 2017/0066215 | A1 * | 3/2017 | Cheich | B31D 5/0047 | |
| 2017/0095991 | A1 * | 4/2017 | Wetsch | B31D 5/0039 | |
| 2017/0313016 | A1 * | 11/2017 | Schalk | B31D 5/0039 | |
| 2018/0297804 | A1 * | 10/2018 | Dominak | B65H 19/1852 | |
| 2018/0326689 | A1 * | 11/2018 | Wetsch | B31D 5/0052 | |
| 2019/0091959 | A1 | 3/2019 | Lemmens | | |
| 2019/0176431 | A1 | 6/2019 | Carlson et al. | | |
| 2020/0039170 | A1 * | 2/2020 | Cheich | B31D 5/0052 | |
| 2020/0139660 | A1 * | 5/2020 | Corbin | B31D 5/0043 | |
| 2020/0180255 | A1 * | 6/2020 | Cheich | B31D 5/0043 | |
| 2020/0180256 | A1 * | 6/2020 | Cheich | B31D 5/0047 | |
| 2021/0023808 | A1 * | 1/2021 | Demers | B31D 5/0047 | |
| 2022/0048270 | A1 * | 2/2022 | Orsini | B31D 5/0039 | |
| 2024/0001639 | A1 * | 1/2024 | Wetsch | B31D 5/0052 | |

FOREIGN PATENT DOCUMENTS

| | | | |
|---|---|---|---|
| GB | 2508267 | A | 5/2014 |
| WO | 2007103466 | A2 | 9/2007 |

* cited by examiner

DUNNAGE SYSTEMS WITH AUTOMATED FEEDING CAPABILITY

CROSS-REFERENCE TO RELATED APPLICATIONS

The present application claims the benefit under 35 U.S.C. 119(e) of U.S. Provisional Application Ser. No. 63/367,600, filed Jul. 1, 2022, which is incorporated herein by reference in its entirety.

TECHNICAL FIELD

The present disclosure relates to systems that convert paper stock and other materials into dunnage for use as packing material.

BACKGROUND

Paper-based protective packaging, or dunnage, is produced by crumpling or otherwise deforming paper stock. More specifically, paper dunnage is produced by running a generally continuous strip of paper through a dunnage conversion machine. The continuous strip of paper can be provided from, for example, a roll of paper or a fanfold stack of paper. The dunnage conversion machine converts the stock material into a lower density dunnage material using, for example, opposing rollers between which the stock material is passed. The rollers grip and pull the stock material from the roll or stack, and deform the stock material as the material passes between the rollers. The resulting dunnage can be cut into desired lengths to effectively fill a void space within a container holding a product. The individual pieces of dunnage material may be produced on an as-needed basis for a human operator or automated equipment performing packing operations, with the individual pieces typically being grasped or otherwise manipulated by the operator or the equipment immediately after being cut. The operator or the automated equipment typically commands the production of each piece of dunnage when needed during the packing operation.

SUMMARY

In one aspect of the disclosed technology, a dunnage conversion machine includes a drive mechanism configured to deform a stock material into a continuous length of dunnage, and a cutting mechanism. The cutting mechanism includes a cutting device configured to sever a piece of the dunnage from the continuous length of dunnage, and a grip configured to exert a force on the piece of dunnage to retain the piece of dunnage on the dunnage conversion machine.

In another aspect of the disclosed technology, the drive mechanism includes one or more rollers.

In another aspect of the disclosed technology, the cutting device includes a blade.

In another aspect of the disclosed technology, the grip is further configured to move between a first position at which grip the exerts the force on the piece of dunnage; and a second position.

In another aspect of the disclosed technology, the grip is further configured so that the grip does not retain the piece of dunnage when the grip is in the second position.

In another aspect of the disclosed technology, the dunnage conversion machine further includes a controller. The cutting mechanism further includes a sensor communicatively coupled to the controller and configured to detect the presence of the piece of dunnage with a sensing field of the sensor, and a drive mechanism communicatively coupled to the controller and configured to move the grip between the first and second positions of the grip.

The controller is configured to generate an output when the piece of dunnage is removed from a sensing field of the sensor. The output, when received by the drive mechanism, causes the drive mechanism to move the grip from the first position to the second position.

In another aspect of the disclosed technology, the grip is further configured to hold the piece of dunnage against an adjacent surface of the dunnage conversion machine with sufficient compression to prevent the piece of dunnage from dropping from the dunnage conversion machine.

In another aspect of the disclosed technology, the dunnage conversion machine further includes a housing configured to support the cutting device. The grip is further configured to hold the severed piece of dunnage against the housing.

In another aspect of the disclosed technology, the grip is further configured to hold the piece of dunnage against the adjacent surface of the dunnage conversion machine with sufficient compression to retain the piece of dunnage on the dunnage conversion machine until the piece of dunnage is pulled from the dunnage conversion machine.

In another aspect of the disclosed technology, the cutting mechanism further includes a bumper mounted on the grip and configured to contact and retain the piece of dunnage when the grip is in the first position.

In another aspect of the disclosed technology, the drive mechanism further includes at least one roller configured to feed the continuous length of dunnage to the cutting mechanism in a first direction. The drive mechanism is further configured to, in response to an input from the controller, reverse a direction of rotation of the at least one roller while the grip is in the first position so that the drive mechanism pulls the continuous length of dunnage in a second direction opposite the first direction, causing the cutting device to sever the piece of dunnage from the continuous length of dunnage.

In another aspect of the disclosed technology, the grip is further configured so that the force exerted by the grip prevents the continuous length of dunnage from moving in the second direction as the drive mechanism pulls the continuous length of dunnage in the second direction.

In another aspect of the disclosed technology, the cutting device is a blade, and the grip is further configured to cause the continuous length of dunnage to wrap around the blade when the grip is in the first position.

In another aspect of the disclosed technology, an outer surface of the bumper includes a tacky material.

In another aspect of the disclosed technology, the bumper includes an elastomeric material.

In another aspect of the disclosed technology, the output generated by the controller when the piece of dunnage is removed from the sensing field of the sensor is a first output, and the controller is further configured to generate a second output when the sensor detects that the piece of dunnage is within the sensing field of the sensor. The second output, when received by the drive mechanism, causes the drive mechanism to maintain the grip in the first position.

In another aspect of the disclosed technology, the grip is configured to hold the severed piece of dunnage at a location in the cutting assembly downstream of the blade.

In another aspect of the disclosed technology, a system for producing dunnage includes a dunnage conversion machine having a drive mechanism configured to deform a stock material into dunnage, and an intake configured to feed the stock material to the dunnage conversion machine. The intake includes an inlet chute connected to the dunnage conversion machine, and a projection connected to the inlet chute. The projection includes a plurality of surface portions configured to bend the stock material as the stock material passes over the surface portions.

In another aspect of the disclosed technology, the projection extends downward from an inlet end of the inlet chute.

In another aspect of the disclosed technology, the projection includes a faceted surface having the plurality of surface portions.

In another aspect of the disclosed technology, the plurality of surface portions also include a substantially planar upper surface portion, outwardly curved intermediate surface portion that adjoins the upper surface portion, and a substantially planar lower surface portion that adjoins the intermediate surface portion.

In another aspect of the disclosed technology, the upper surface portion is angled upwardly and in a direction of travel of the stock material into the intake, and the lower surface portion is angled downwardly and in the direction of travel of the stock material into the intake.

In another aspect of the disclosed technology, the upper surface portion is a first upper surface portion, the intermediate surface portion is a first intermediate surface portion, and the intermediate surface portion is a first lower surface portion.

The plurality of surface portions further includes a second upper surface portion that adjoins the first upper surface portion. The first and second upper surface portions are symmetrically disposed about a transverse centerline of the projection. The plurality of surface portions also includes a second intermediate surface portion that adjoins the first intermediate surface portion. The first and second intermediate surface portions are symmetrically disposed about the transverse centerline of the projection.

The plurality of surface portions further includes a second lower surface portion that adjoins the first lower surface portion. The first and second lower surface portions are symmetrically disposed about the transverse centerline of the projection.

In another aspect of the disclosed technology, the plurality of surface portions further includes a first and a second upper end portion each having a curved profile. The first upper end portion adjoins a first side of the projection and the first upper surface portion, and the second upper end portion adjoins a second side of the projection and the second upper surface portion.

The plurality of surface portions further includes a first and a second intermediate end portion each having a curved profile. The first intermediate end portion adjoins the first side and the first intermediate surface portion. The second intermediate end portion adjoins the second side and the second intermediate surface portion.

The plurality of surface portions further includes a first and a second lower end portion each having a curved profile. The first lower end portion adjoins the first side and the first lower surface portion. The second lower end portion adjoins the second side and the second lower surface portion.

In another aspect of the disclosed technology, the dunnage conversion machine includes one or more rollers.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
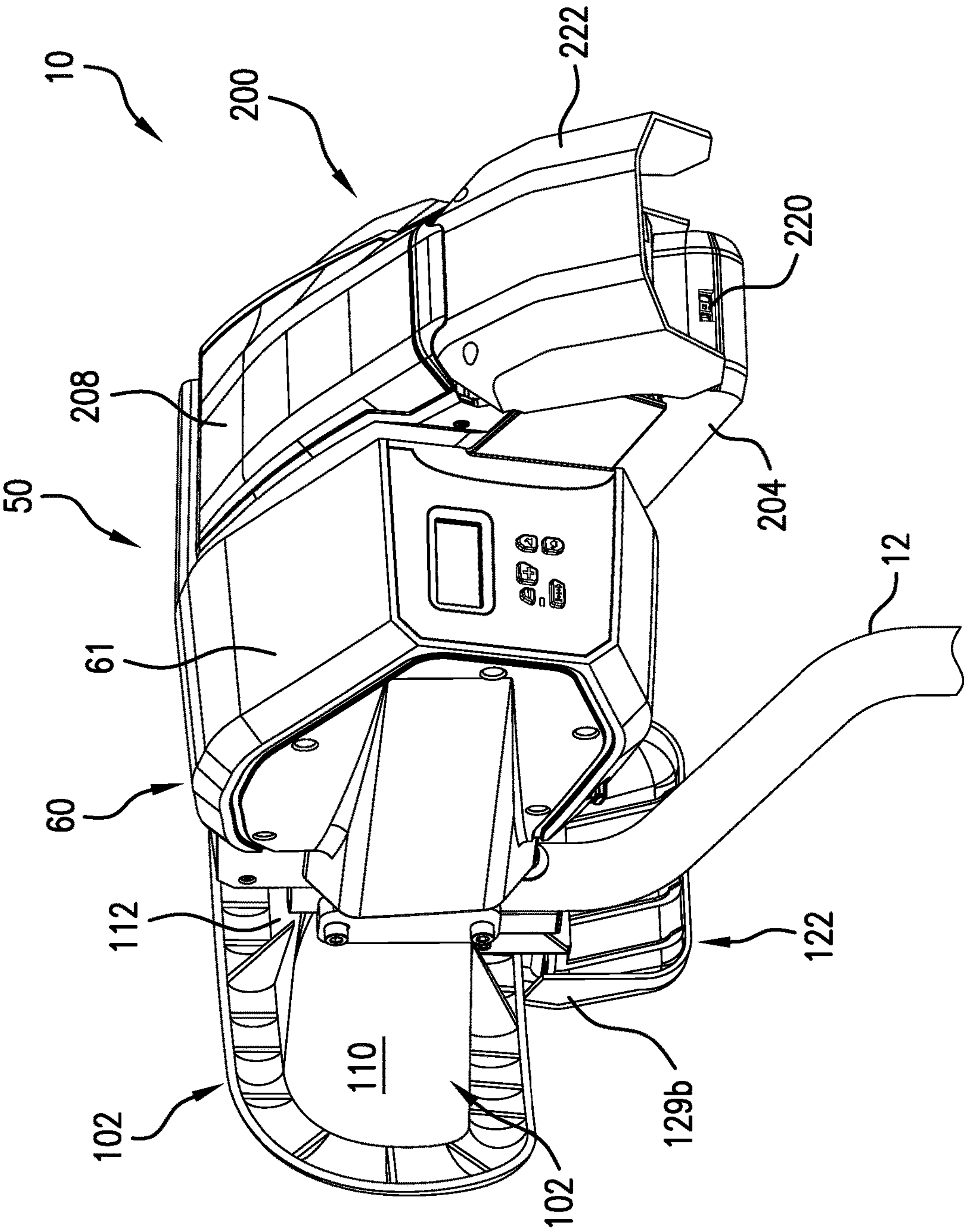
FIG. 1 is a front perspective view of a system for producing dunnage, depicting a grip of the system in an open position.
Figure 2:
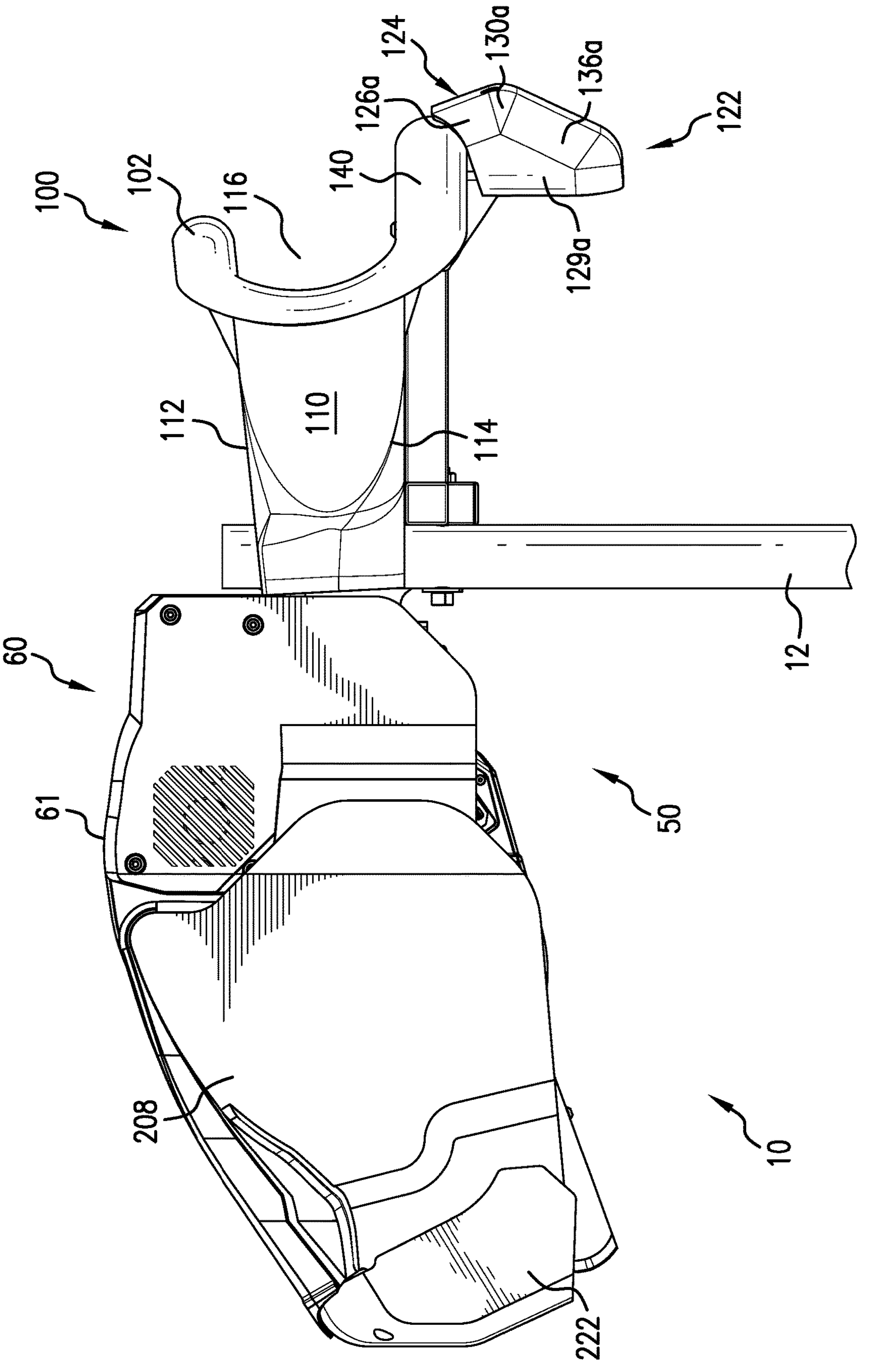
FIG. 2 is a side view of the system shown in FIG. 1, depicting the grip in the closed position.
Figure 3:
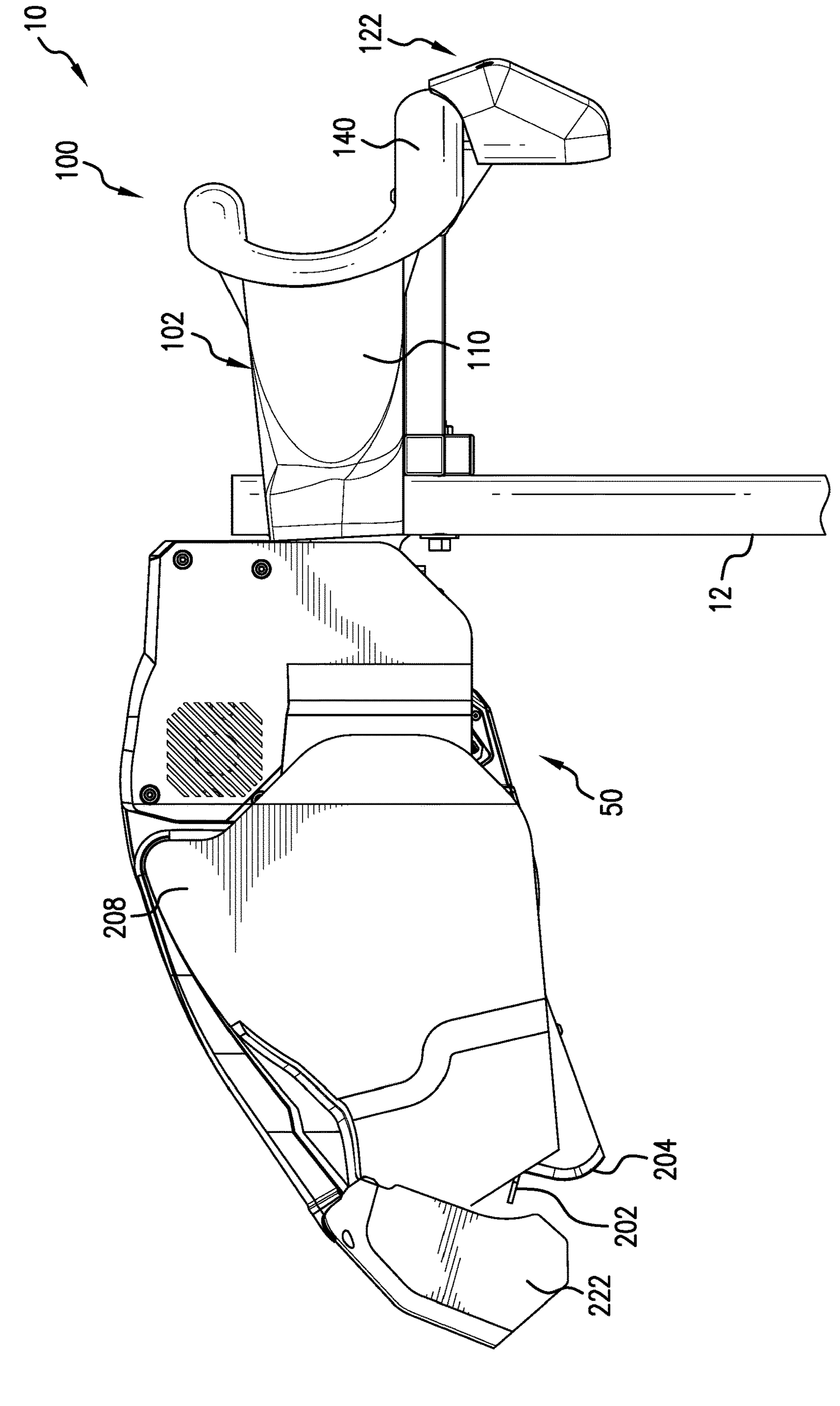
FIG. 3 is a side view of the system shown in FIGS. 1 and 2, depicting the grip in an open position.

The following discussion omits or only briefly describes conventional features of the disclosed technology that are apparent to those skilled in the art. Reference to various embodiments does not limit the scope of the claims attached hereto. Additionally, any examples set forth in this specification are intended to be non-limiting and merely set forth some of the many possible embodiments for the appended claims. Further, particular features described herein can be used in combination with other described features in each of the various possible combinations and permutations. A person of ordinary skill in the art would know how to use the instant invention, in combination with routine experiments, to achieve other outcomes not specifically disclosed in the examples or the embodiments.

Unless otherwise specifically defined herein, all terms are to be given their broadest possible interpretation including meanings implied from the specification as well as meanings understood by those skilled in the art and/or as defined in dictionaries, treatises, etc. Unless defined otherwise, all technical and scientific terms used herein have the same meaning as commonly understood by one of ordinary skill in the art in the field of the disclosed technology. It must also be noted that, as used in the specification and the appended claims, the singular forms "a," "an" and "the" include plural referents unless otherwise specified, and that the terms "includes" and/or "including," when used in this specification, specify the presence of stated features, elements, and/or components, but do not preclude the presence or addition of one or more other features, steps, operations, elements, components, and/or groups thereof. Additionally, methods, equipment, and materials similar or equivalent to those described herein can also be used in the practice or testing of the disclosed technology.

Various examples of the disclosed technology are provided throughout this disclosure. The use of these examples is illustrative only, and in no way limits the scope and meaning of the invention or of any exemplified form. Likewise, the invention is not limited to any particular preferred embodiments described herein. Indeed, modifications and variations of the invention may be apparent to those skilled in the art upon reading this specification, and can be made without departing from its spirit and scope. The invention is therefore to be limited only by the terms of the claims, along with the full scope of equivalents to which the claims are entitled.

Certain relationships between features of the suppressor are described herein using the term "substantially" or "substantially equal." As used herein, the terms "substantially" and "substantially equal" indicate that the equal relationship is not a strict relationship and does not exclude functionally similar variations therefrom. Unless context or the description indicates otherwise, the use of the term "substantially" or "substantially equal" in connection with two or more described dimensions indicates that the equal relationship between the dimensions includes variations that, using mathematical and industrial principles accepted in the art (e.g., rounding, measurement or other systematic errors, manufacturing tolerances, etc.), would not vary the least significant digit of the dimensions. As used herein, the term "substantially parallel" indicates that the parallel relationship is not a strict relationship and does not exclude functionally similar variations therefrom. As used herein, the term "substantially orthogonal" indicates that the orthogonal relationship is not a strict relationship and does not exclude functionally similar variations therefrom.

Systems for converting a high-density stock material into low-density dunnage are disclosed. The stock material is processed by longitudinal crumple machines that form creases longitudinally in the stock material to form dunnage, or by cross crimple machines that forms creases transversely across the stock material. The supply unit of stock material can be stored in a roll (whether drawn from inside or outside the roll), a wind, a fan-folded source, or other suitable form. The stock material can be continuous or perforated. The conversion apparatus is fed the stock material from the supply unit in a first direction, which can be an anti-run out direction.

The stock material can be any suitable type of protective packaging material including, for example, flat or rolled paper stock, other dunnage and void fill materials, inflatable packaging pillows, etc. Some embodiments can use supplies of other paper or fiber-based materials in sheet form. Other embodiments can use supplies of wound fiber material such as ropes or thread. Other embodiments can use thermoplastic materials such as a web of plastic material usable to form pillow packaging material. Examples of paper used include a fan-folded supply unit having stock material with 30-inch transverse widths, as depicted in FIGS. 24A-25D and/or 15-inch transverse widths, as depicted in FIGS. 22A-23D. Preferably these sheets are fan folded as single layers. In other embodiments, the multiple layers of sheets can be fan folded together such that dunnage is made of superimposed sheets that are crumpled together in the conversion process.

Any suitable stock material may be used. For example, the stock material can have a basis weight of about 20 lbs. to about 100 lbs. The stock material may comprise paper stock stored in a high-density configuration having a first longitudinal end and a second longitudinal end, that is later converted into a low-density configuration by the conversion system. The stock material can be a ribbon of sheet material that is stored in a fan-fold structure, or in coreless rolls. The stock material can be formed or stored as single-ply or multiple plies of material. Where multi-ply material is used, a layer can include multiple plies. Other types of material can be used, such as pulp-based virgin and recycled papers, newsprint, cellulose and starch compositions, and poly or synthetic material, of suitable thickness, weight, and dimensions.

In some embodiments, the supply units of stock material may have fan-fold configurations as depicted in FIGS. 22A-25D. For example, a foldable material, such as paper, may be folded repeatedly to form a stack or a three-dimensional body. The term "three-dimensional body," in contrast to the "two-dimensional" material, has three dimensions all of which are non-negligible. A continuous sheet, e.g., a sheet of paper, plastic, or foil, can be folded at multiple fold lines that extend transversely to a longitudinal direction of the continuous sheet, or transversely to the feed direction of the sheet. For example, folding a continuous sheet that has a substantially uniform width along transverse fold lines can form or define sheet sections that have approximately the same width. The continuous sheet can be folded sequentially, in opposite or alternating directions, to produce an accordion-shaped continuous sheet. For example, the folds may form or define sections along the continuous sheet, and the sections may be substantially rectangular.

For example, sequentially folding the continuous sheet may produce an accordion-shaped continuous sheet with sheet sections that have approximately the same size and/or shape as one another. Multiple adjacent sections that are defined by the fold lines can be generally rectangular, and can have the same first dimension, e.g., a dimension corresponding to the width of the continuous sheet, and the same second dimension that is generally along a longitudinal direction of the continuous sheet. For example, when the adjacent sections are contacting one another, the continuous sheet may be configured as a three-dimensional body or a stack, in an accordion shape that is formed by the folds and compressed, so that the continuous sheet forms a three-dimensional body or stack.

The fold lines of the stock material can have any suitable orientation relative to one another, as well as relative to the longitudinal and transverse directions of the continuous sheet. Also, the stock material unit can have transverse folds that are parallel one to another. For example, the sections that are formed by the fold lines can be compressed to form a three-dimensional body that is a rectangular prismoid. Also, the stock material can have one or more folds that are non-parallel relative to the transverse folds. In some applications, such as those depicted in FIGS. 24A-25D, the top sheet can be folded in a pattern that more readily facilitates feeding the top sheet into the dunnage conversion machine.

The stock material can be provided as any suitable number of discrete stock material units. In some embodiments, as shown in FIGS. 23A-23D and 25A-25D, two or more stock material units can be connected together to provide a continuous feed of material into the dunnage conversion machine. The material can be fed from the connected stock material units sequentially or concurrently, i.e., in series or in parallel. The stock material units can have various suitable sizes and configurations, and may include one or more stacks or rolls of suitable sheet materials. The term "sheet material" refers to a material that is generally sheet-like and two-dimensional, i.e., two dimensions of the material are substantially greater than the third dimension so that the third dimension is negligible or de minimus in comparison to the other two dimensions. Also, the sheet material can be generally flexible and foldable, such as the illustrative materials described herein.

The stock material units can include an attachment mechanism that connects multiple units of stock material, for example, to produce a continuous material feed from multiple discrete stock material units. The respective end and beginning of consecutive rolls can be joined by adhesive or other suitable means, to facilitate daisy-chaining the rolls together to form a continuous stream of sheet material that can be fed into the dunnage conversion machine.

Folding a continuous sheet along the transverse fold lines can form or define generally rectangular sheet sections. The rectangular sheet sections can stack together by, for example, folding the continuous sheet in alternating directions, to form the three-dimensional body that has longitudinal, transverse, and vertical dimensions. The stock material from the stock material units can be fed through an intake, such as the intake 100 as shown in the figures. In some applications, the transverse direction of the continuous sheet of stock material can be greater than one or more dimensions of the intake. For example, the transverse dimension of the continuous sheet can be greater than the diameter of a generally round intake. Reducing the width of the continuous sheet in this manner at the start of the conversion process can facilitate passage thereof into the intake. The decreased width of the leading portion of the continuous sheet may facilitate smoother entry and/or transition of a daisy-chained continuous sheet and/or may reduce or eliminate catching or tearing of the continuous sheet. Moreover, reducing the width of the continuous sheet at the start thereof can facilitate connecting together or daisy-chaining two or more stock material units. For example, connecting or daisy-chaining material with a tapered section may be accomplished using smaller connectors or splice elements than would be required otherwise. Also, tapered sections may be easier to manually align and/or connect together in comparison to full-width sheet sections The figures depict an embodiment of a system 10 for producing dunnage. The system 10 is configured to process stock material 19 into dunnage 15. The system 10 includes a supply unit 18 of the stock material 19, and a dunnage apparatus 50.

The dunnage apparatus 50 includes a dunnage conversion machine 60; a support 12 configured to support the dunnage conversion machine 60; and a supply station 13 configured to hold the supply unit 18 of stock material 19.

The specific configuration of the support 12 depicted in the figures is disclosed for illustrative purposes only. The support 12 can have other configurations suitable for supporting the dunnage conversion machine 60.

Likewise, the shelf or basket-type configuration of the supply station 13 depicted in FIGS. 22A-22D, which accommodates a supply unit 18 in the form of a stack of folded stock material 19, is disclosed for illustrative purposes only. The supply station 13 can have other configurations suitable for supporting the supply unit(s) 18 in single bundles; in multiple daisy chained bundles; in a flat configuration; in a rolled configuration; and/or in a curved configuration.

In other embodiments, the supply station 13 can be a basket as shown in FIGS. 22A-22D, a shelf, or other types of supporting structures mounted on the stand 12. In such embodiments, the dunnage conversion machine 60 and the supply station 13 do not move relative to one another. In other embodiments, the supply station 13 and the dunnage conversion machine 60 may be fixed relative to one another but not mounted to each other. In other alternative embodiments, the supply station 13 and the dunnage conversion machine 60 may be configured to move relative to one another while, or without being mounted together.

The supply station 13 can support one or more of the supply units 18 of stock material 19. In some embodiments, the supply station 13 can support a plurality of supply units 18. In applications where multiple supply units 18 are accommodated by the supply station 13, the end and beginning sheets of adjacent supply units 18 may be connected together before or after being placed on the supply station 13. Connecting together or daisy-chaining multiple supply units can produce a continuous supply of stock material 19.

Figure 20:
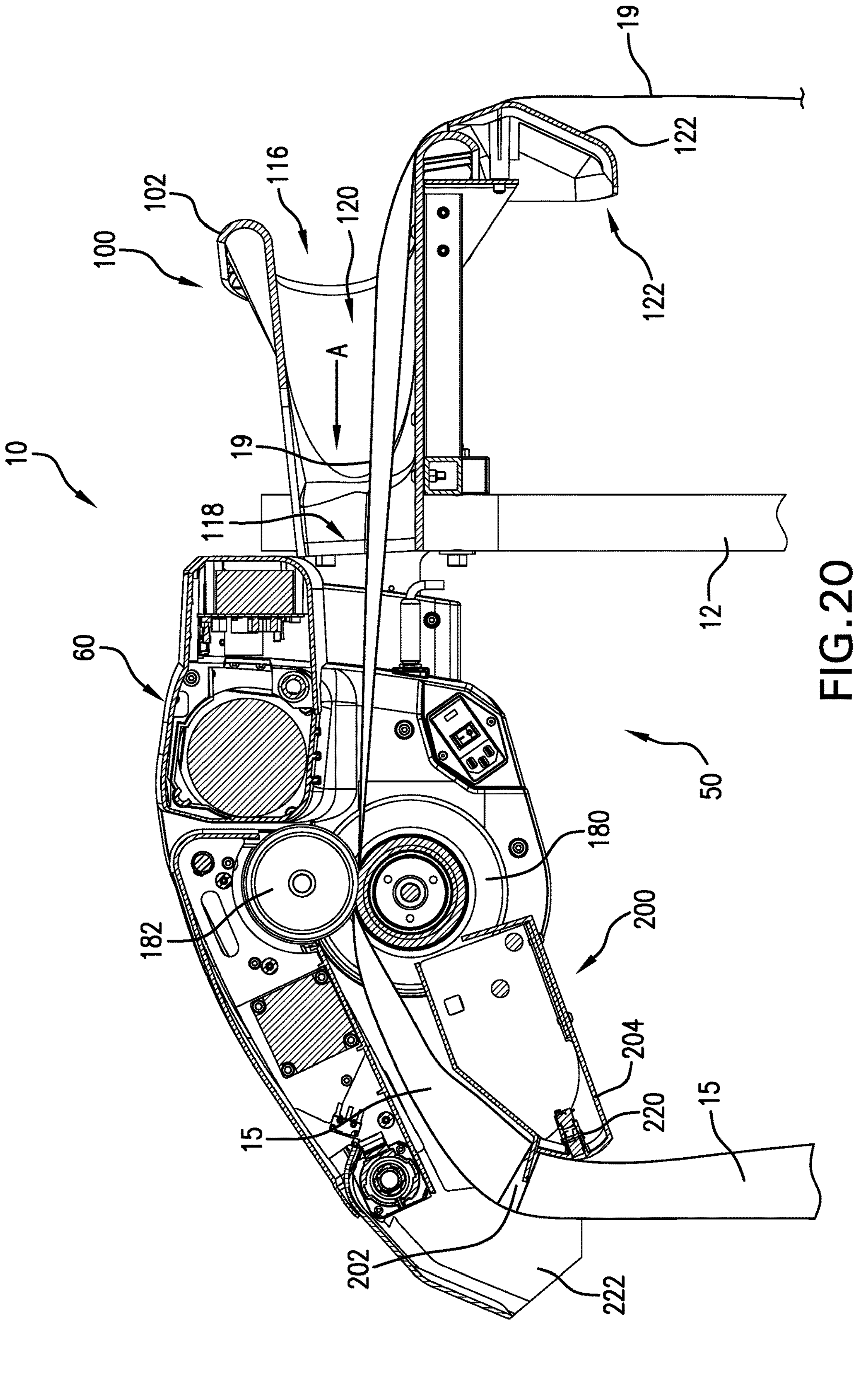
FIG. 20 is a cross-sectional view of the system shown in FIGS. 1-19, taken through the line "IV-IV" of FIG. 7, depicting a piece of the stock material being held by the grip after being cut.
Figure 21:
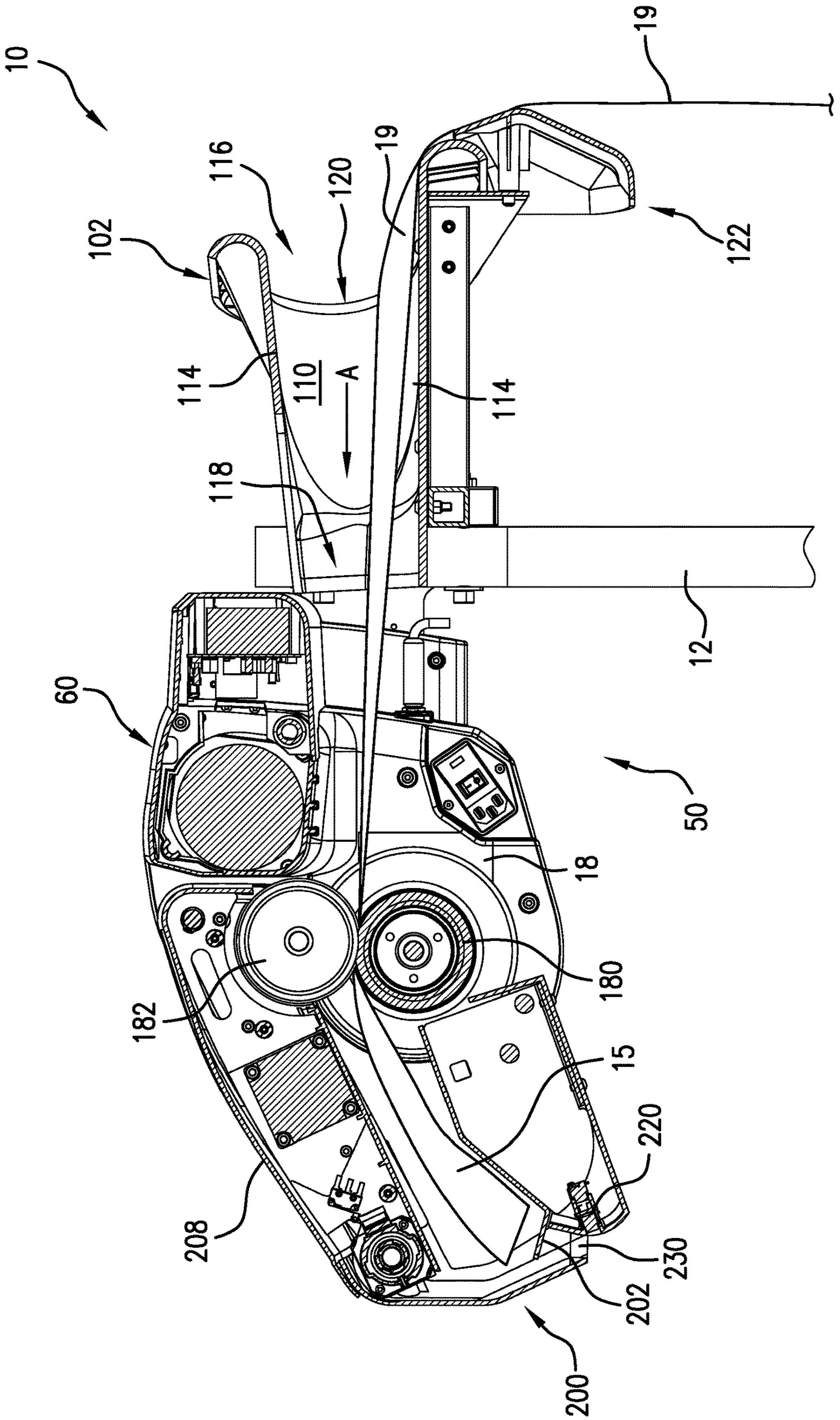
FIG. 21 is a cross-sectional view of the system shown in FIGS. 1-20, taken through the line "IV-IV" of FIG. 7, after the piece of the stock material has been removed from the dunnage conversion machine.
Figure 22A:
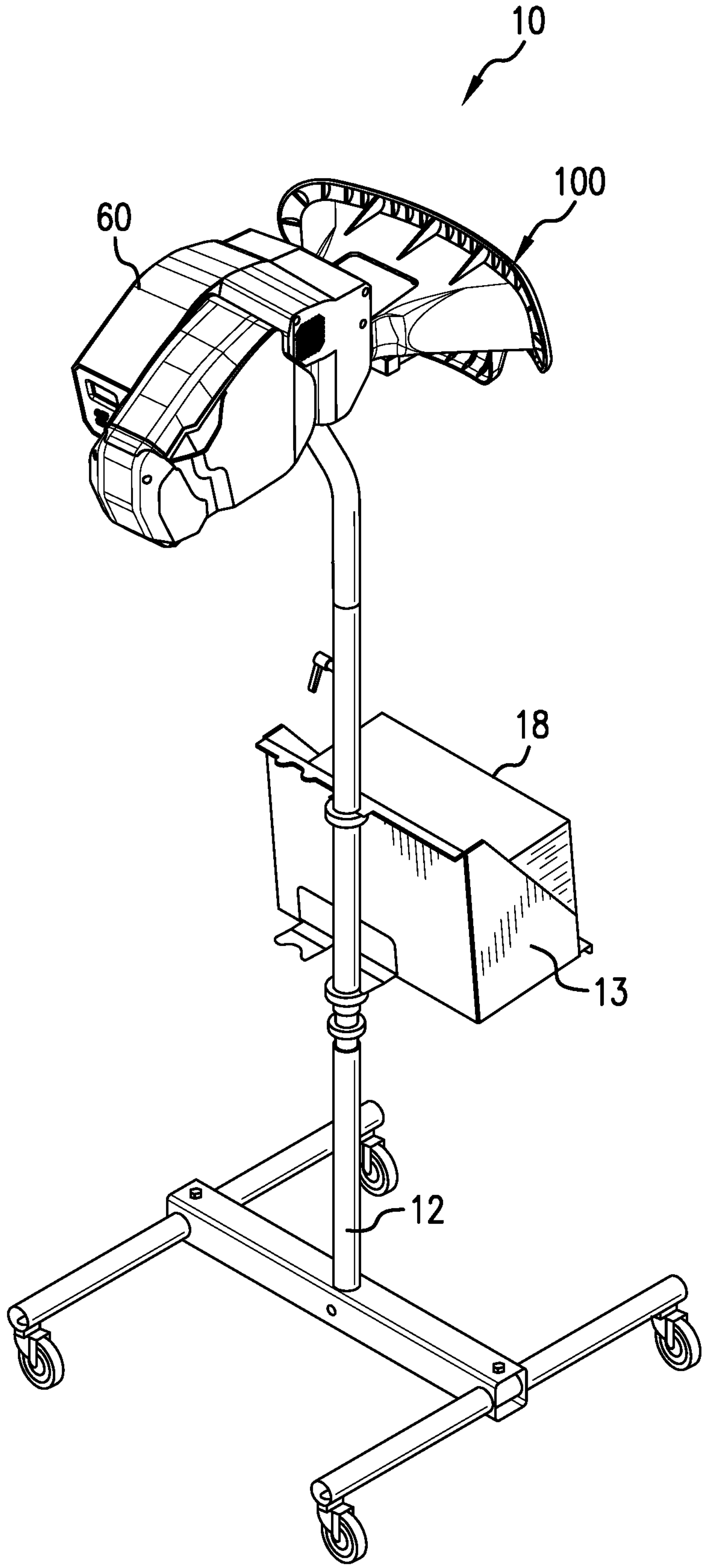
FIGS. 22A-22D are perspective views of the system shown in FIGS. 1-21, configured to hold a single stack of fan-folded stock material.
Figure 22B:
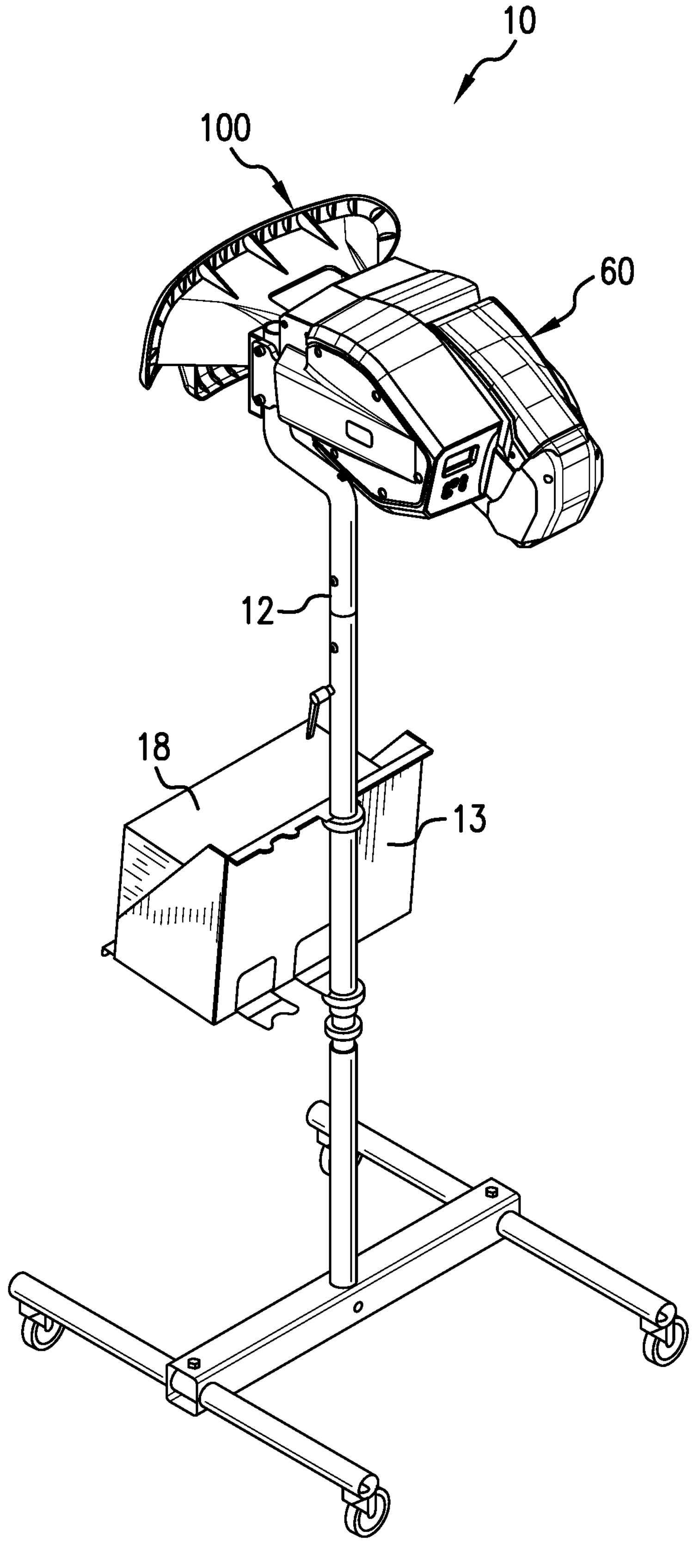
Figure 22C:
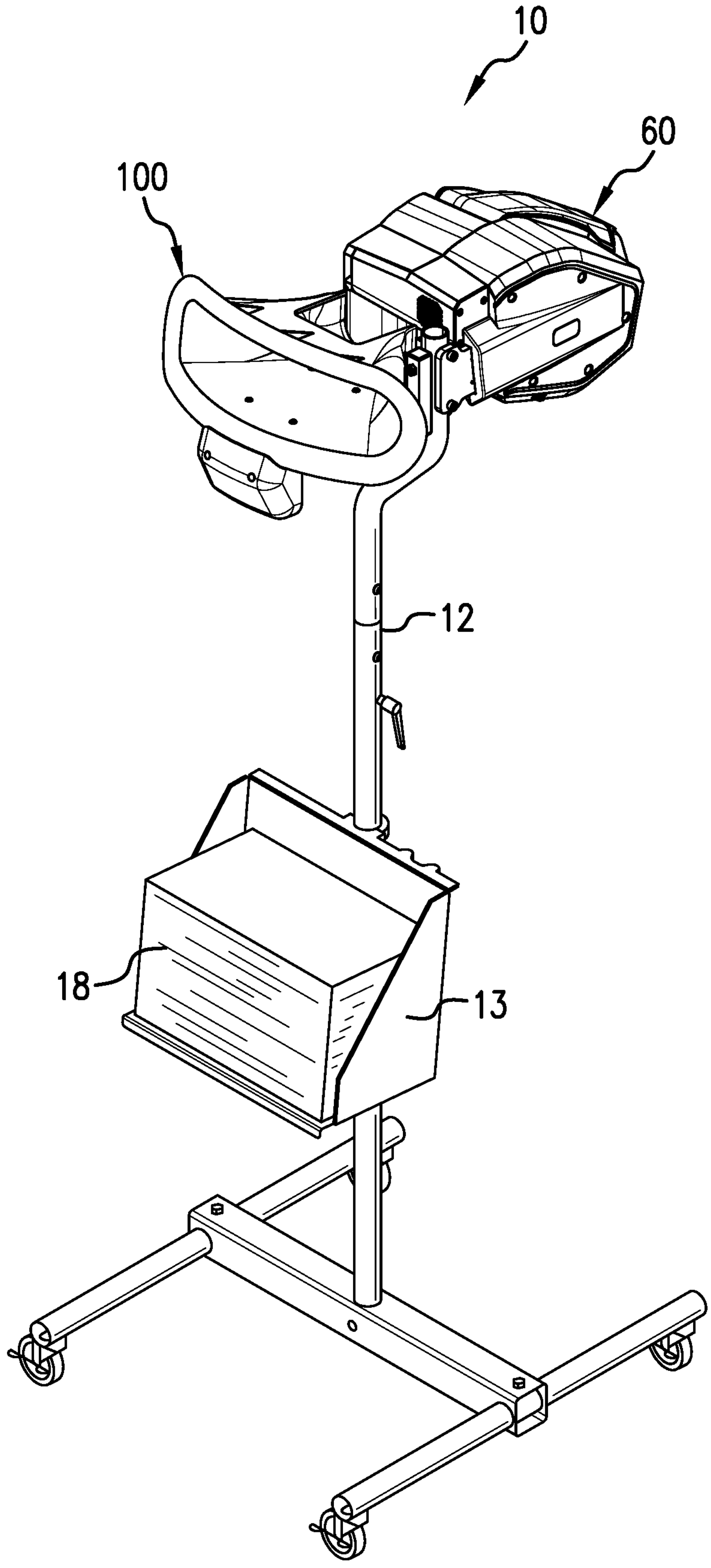
Figure 22D:
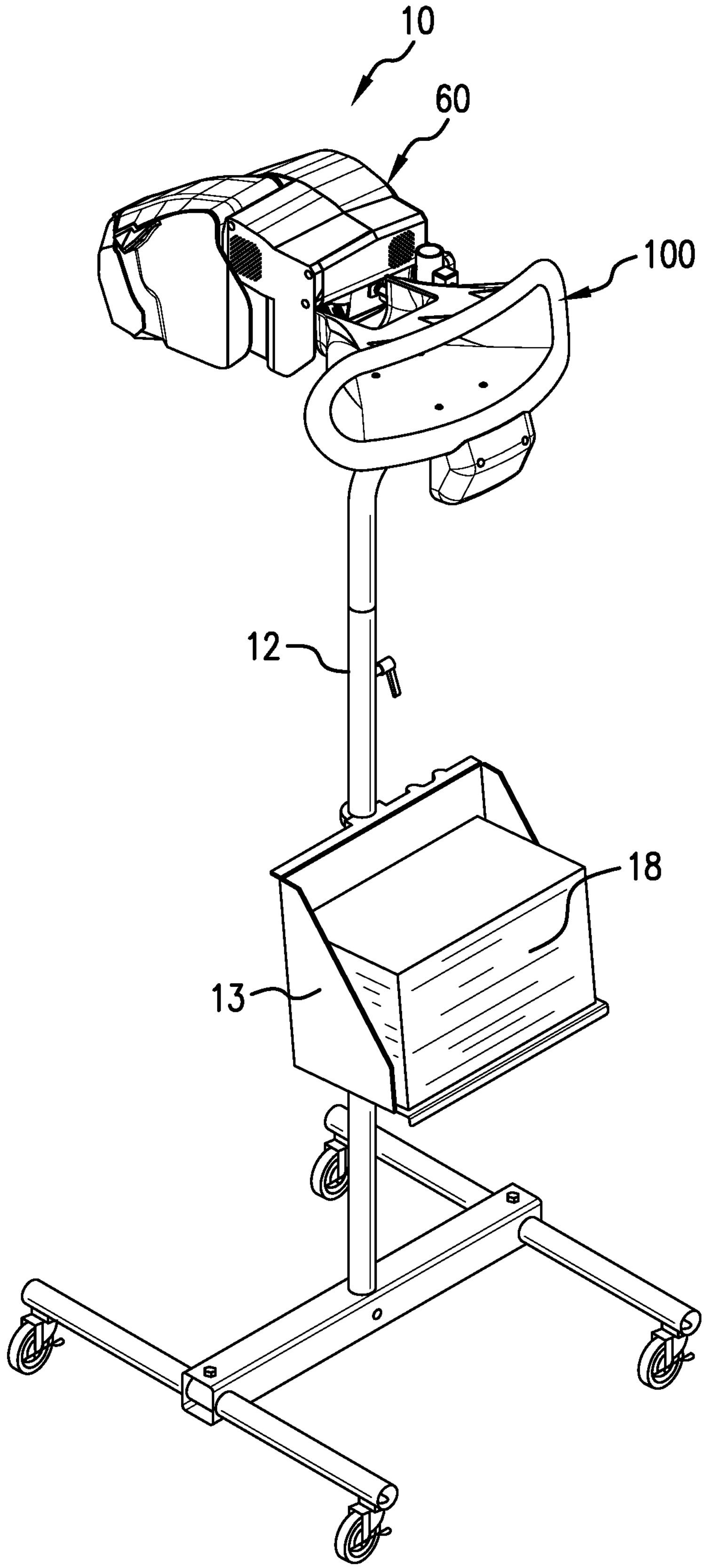
Figure 23A:
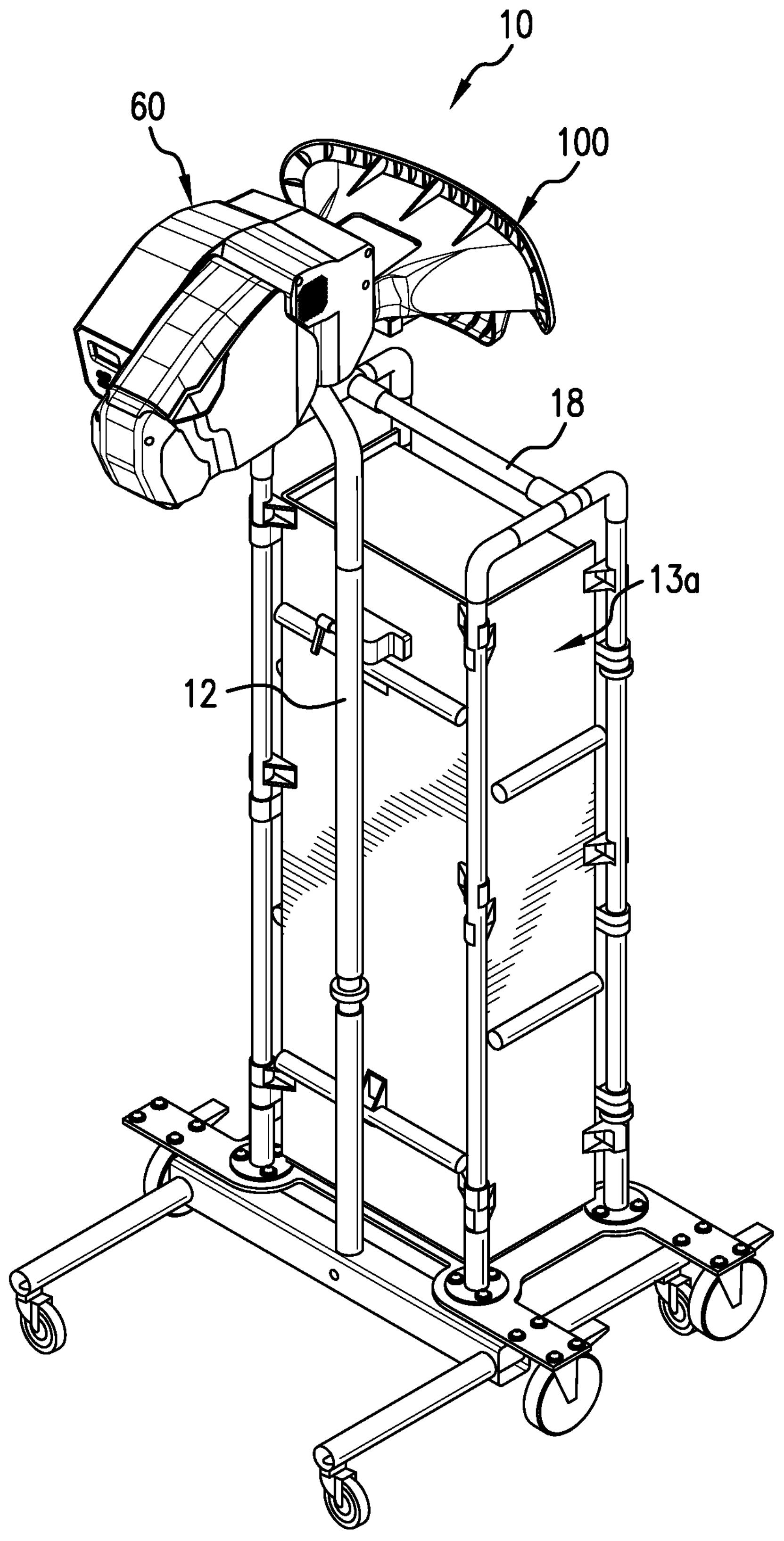
FIGS. 23A-23D are perspective views of the system shown in FIGS. 1-22D, configured to hold multiple stacks of the fan-folded stock material.
Figure 23B:
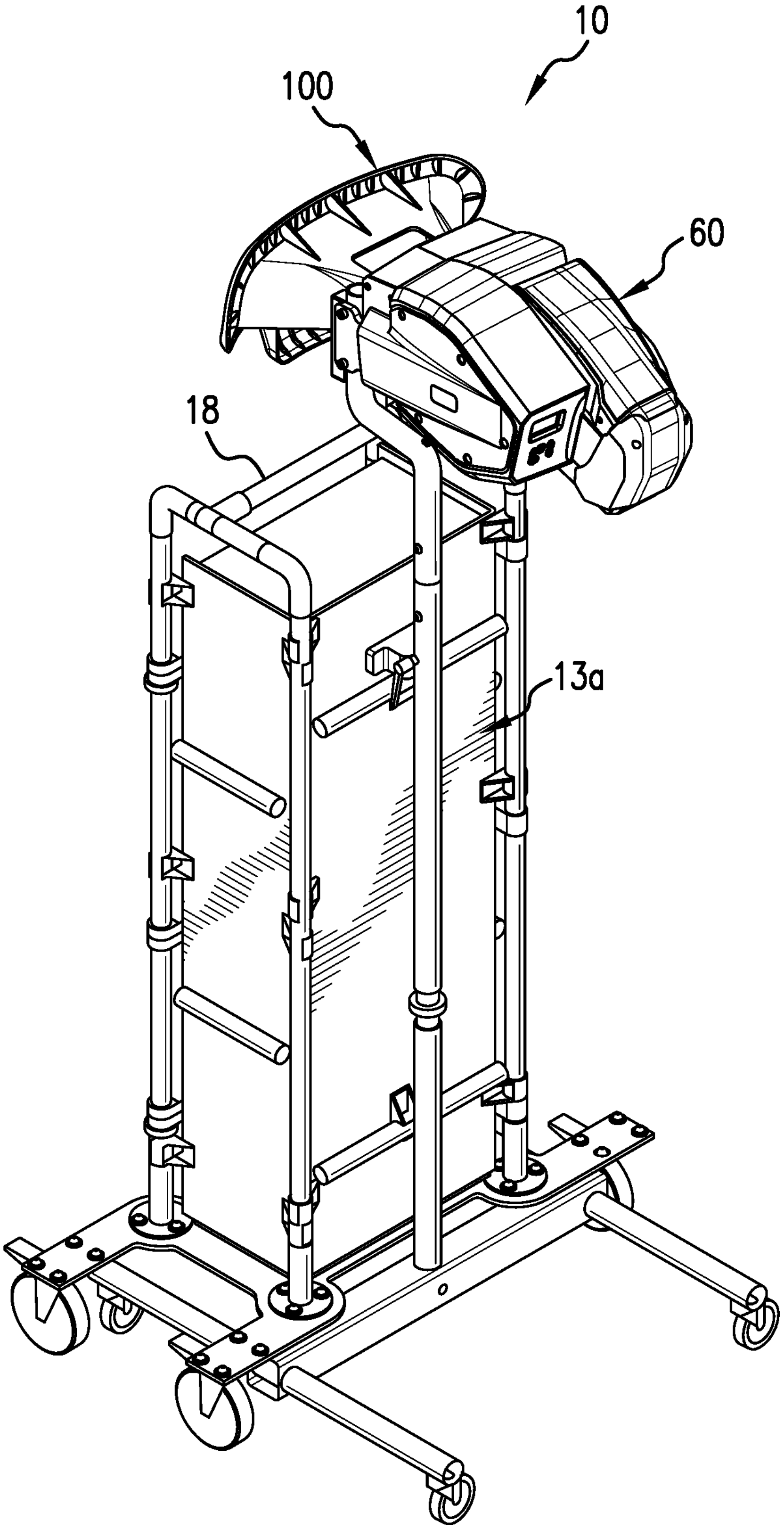
Figure 23C:
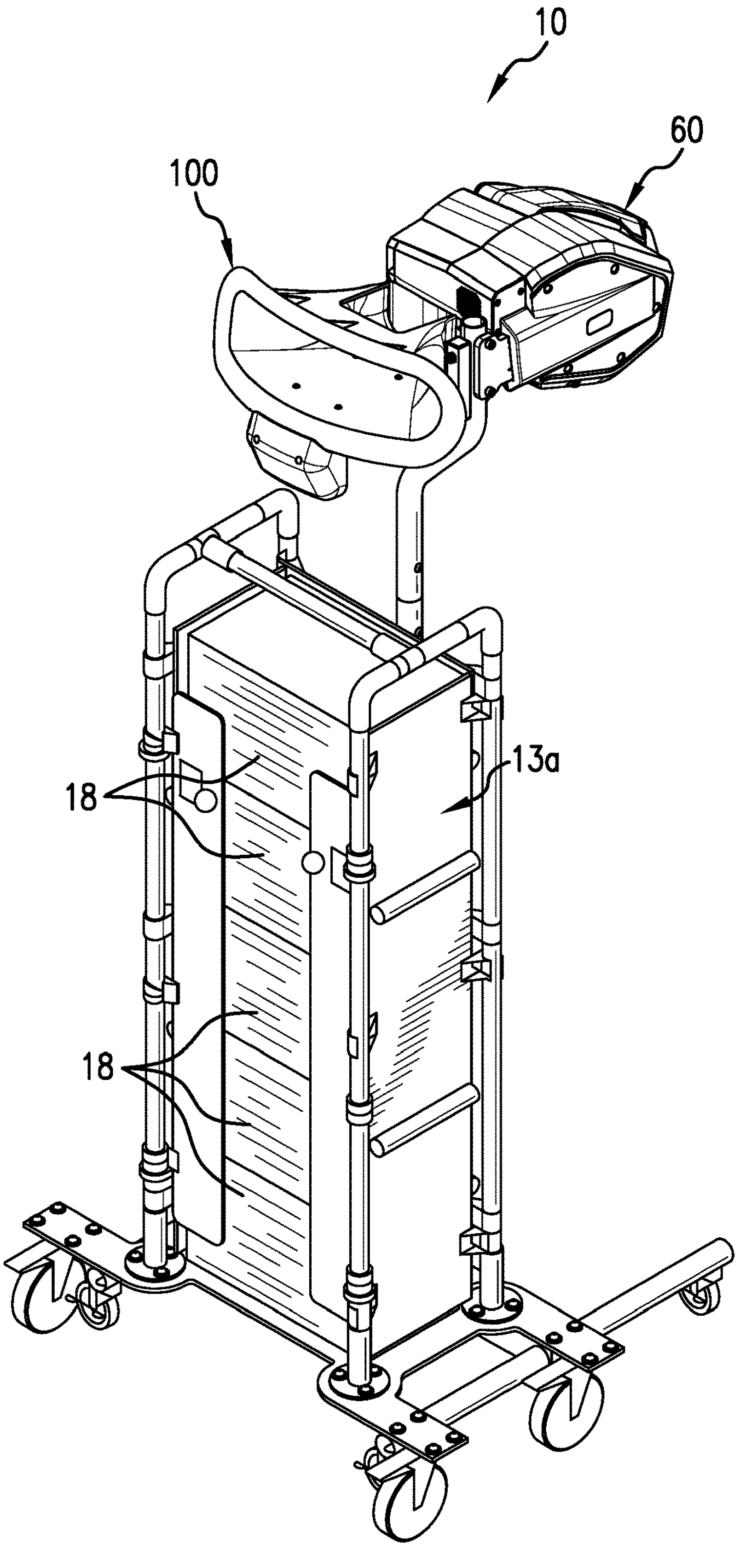
Figure 23D:
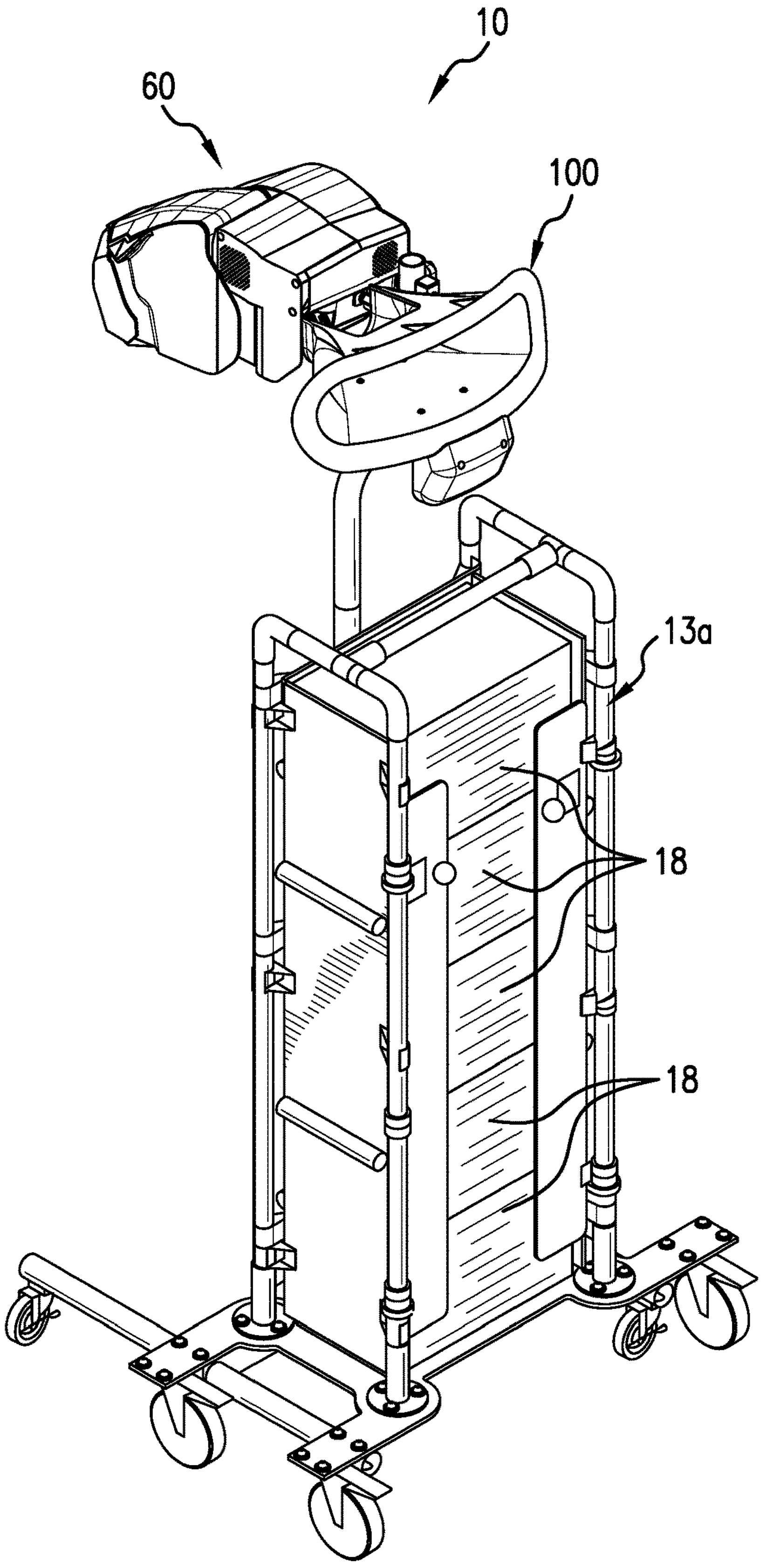
Figure 24A:
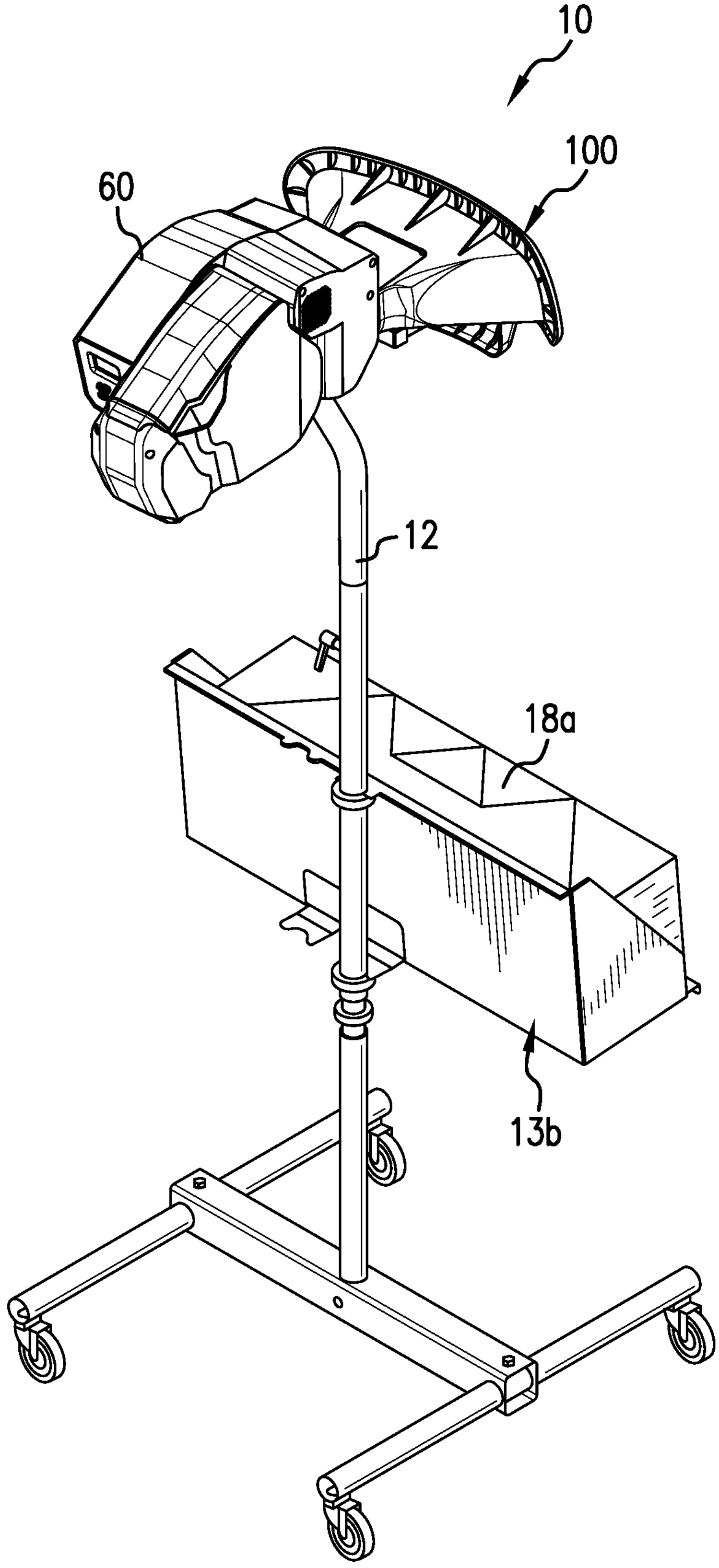
FIGS. 24A-24D are perspective views of the system shown in FIGS. 1-23D, configured to hold a single stack of fan-folded stock material, and with the top sheet of the top stack folded onto itself.
Figure 24B:
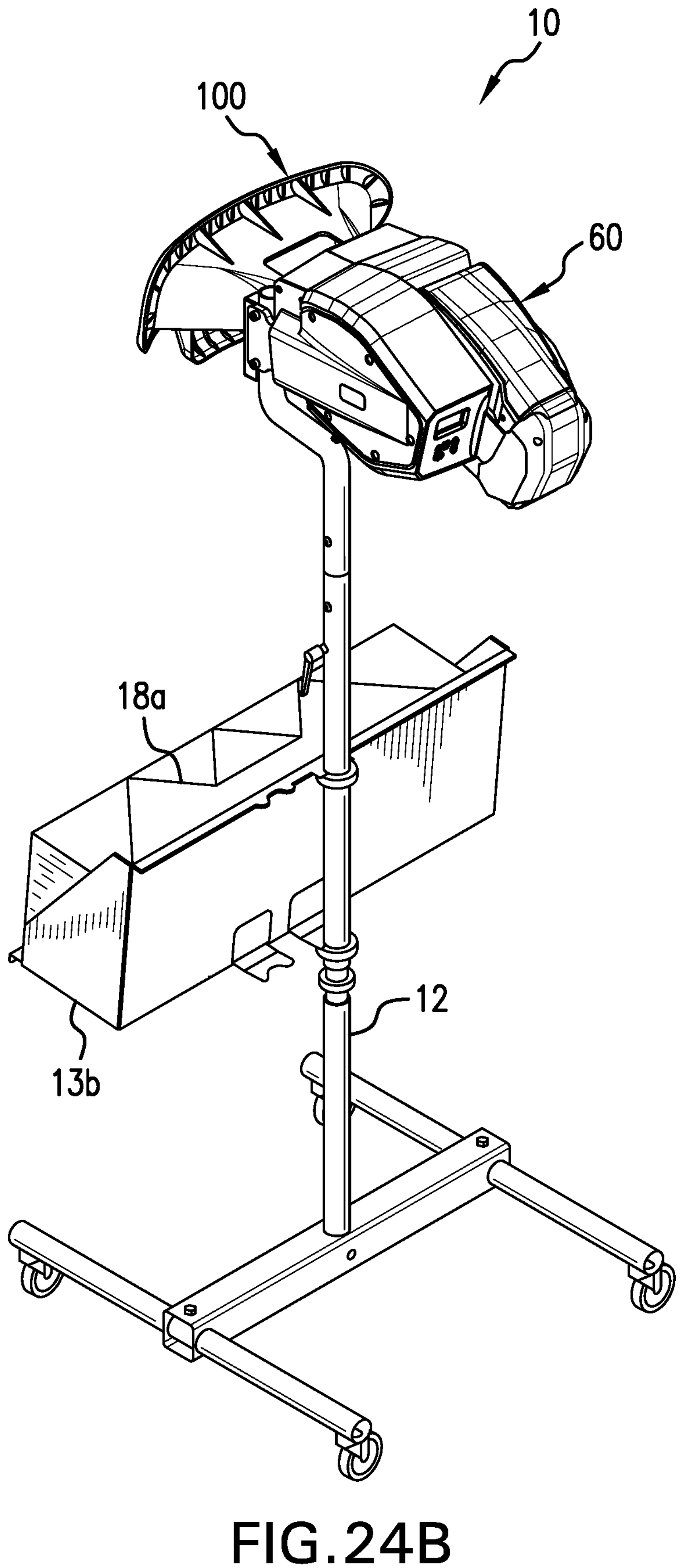
Figure 24C:
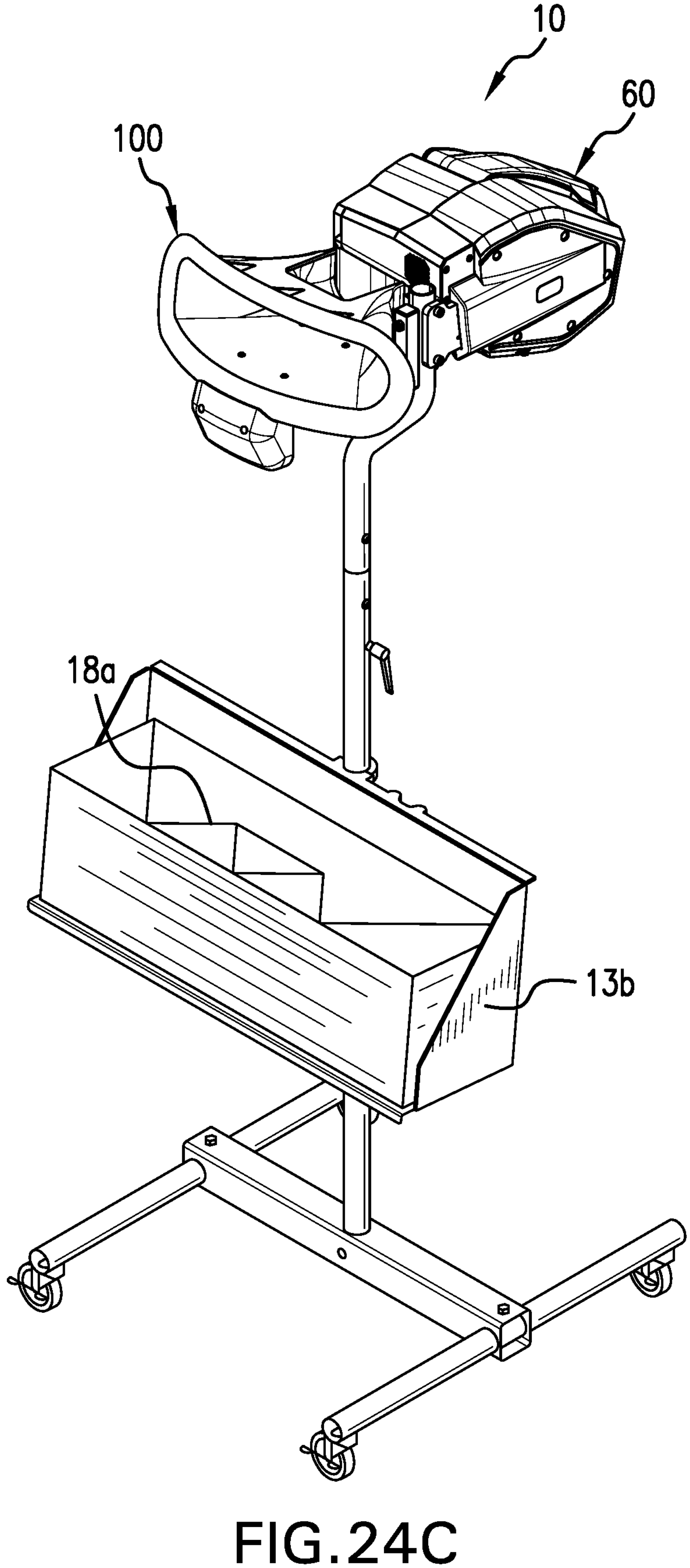
Figure 24D:
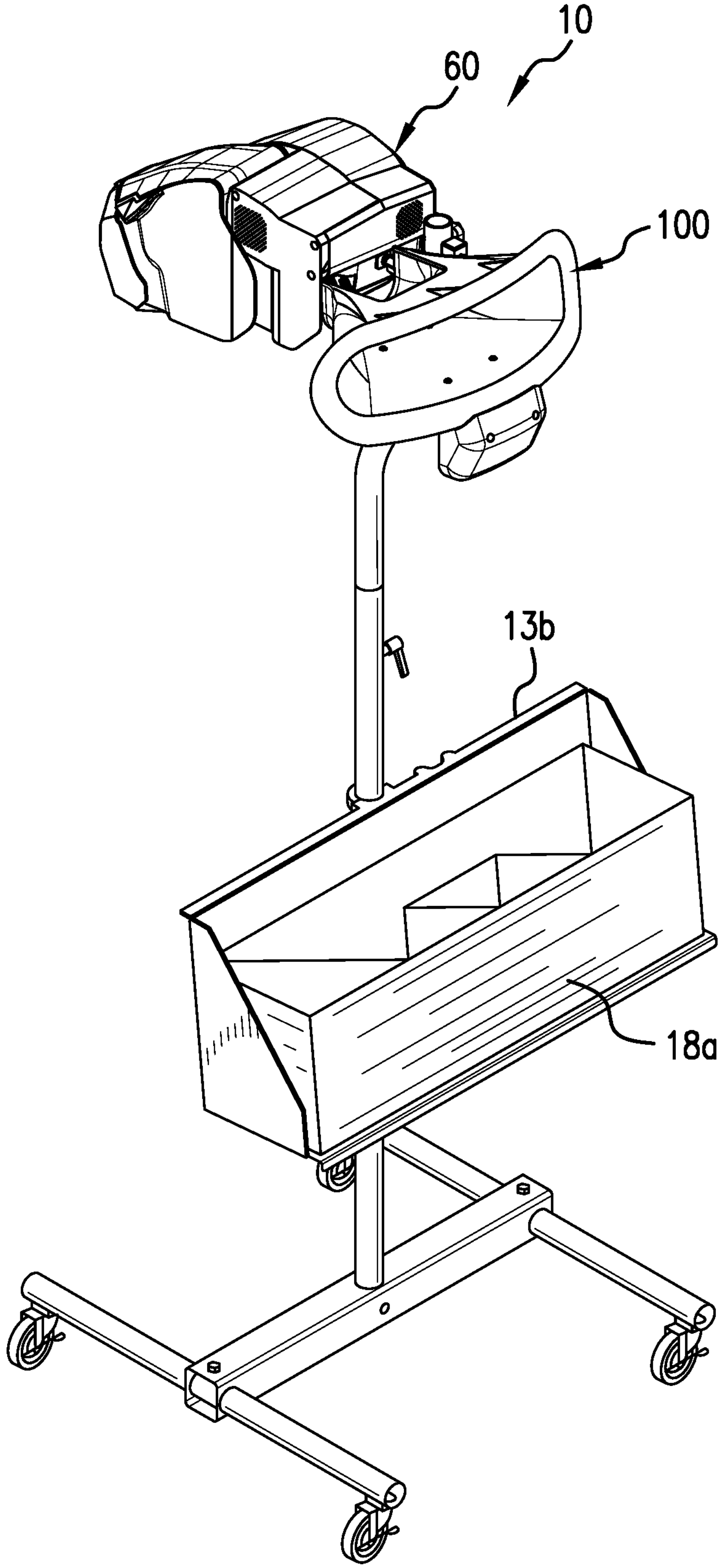
Figure 25A:
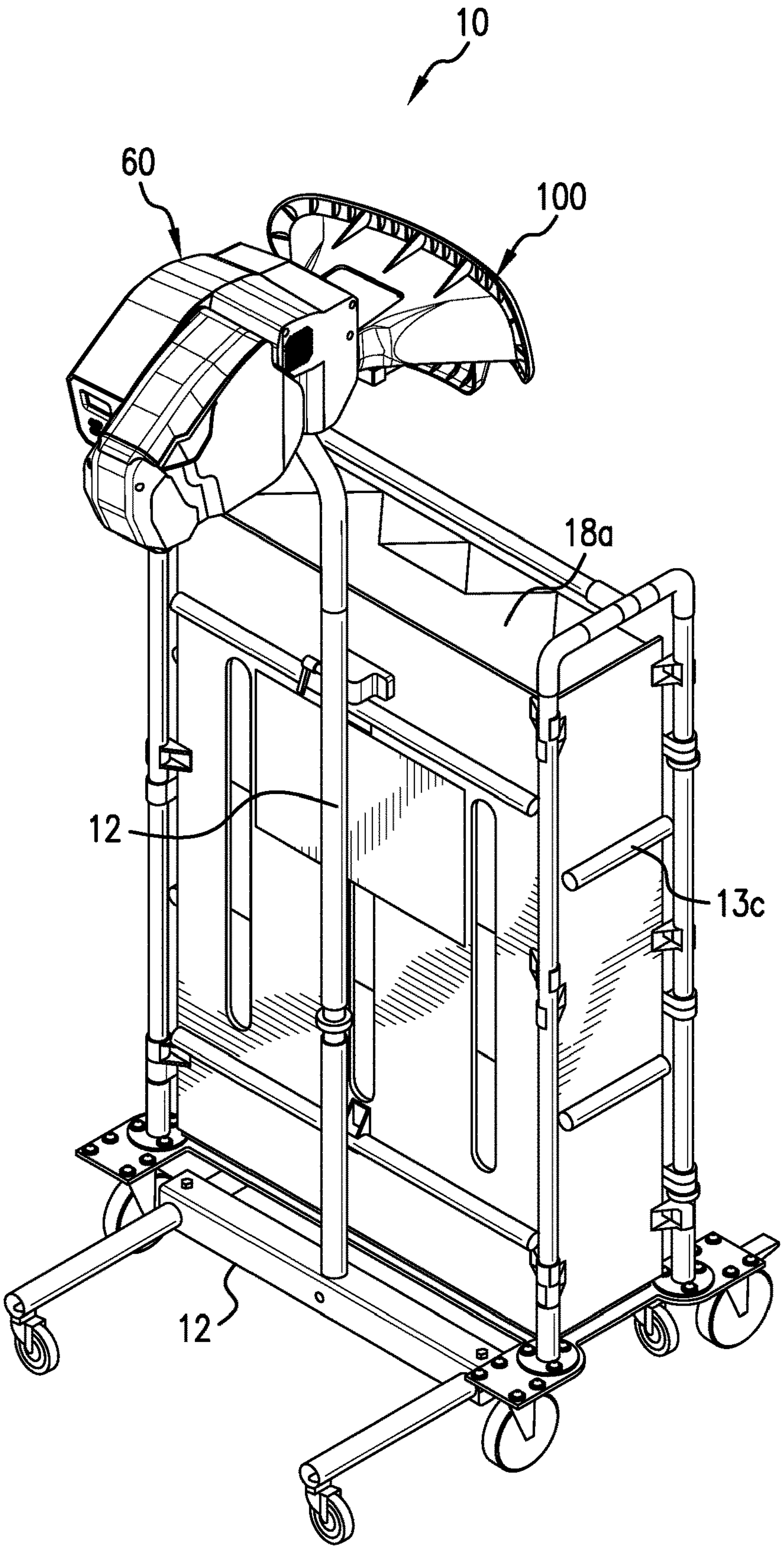
FIGS. 25A-25D are perspective views of the system shown in FIGS. 1-24D, configured to hold multiple stacks of the fan-folded stock material, and with the top sheet of the top stack folded onto itself.
Figure 25B:
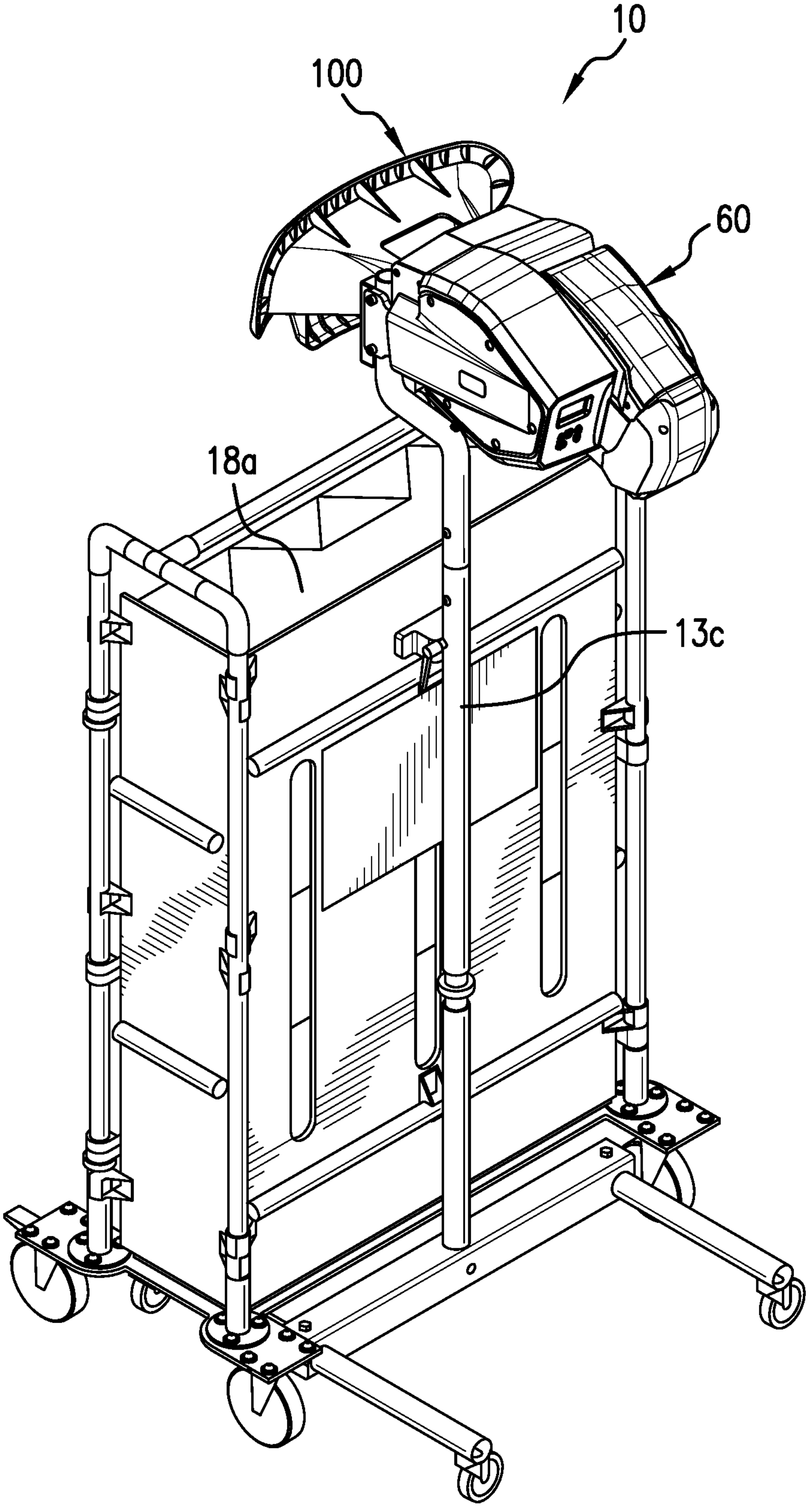
Figure 25C:
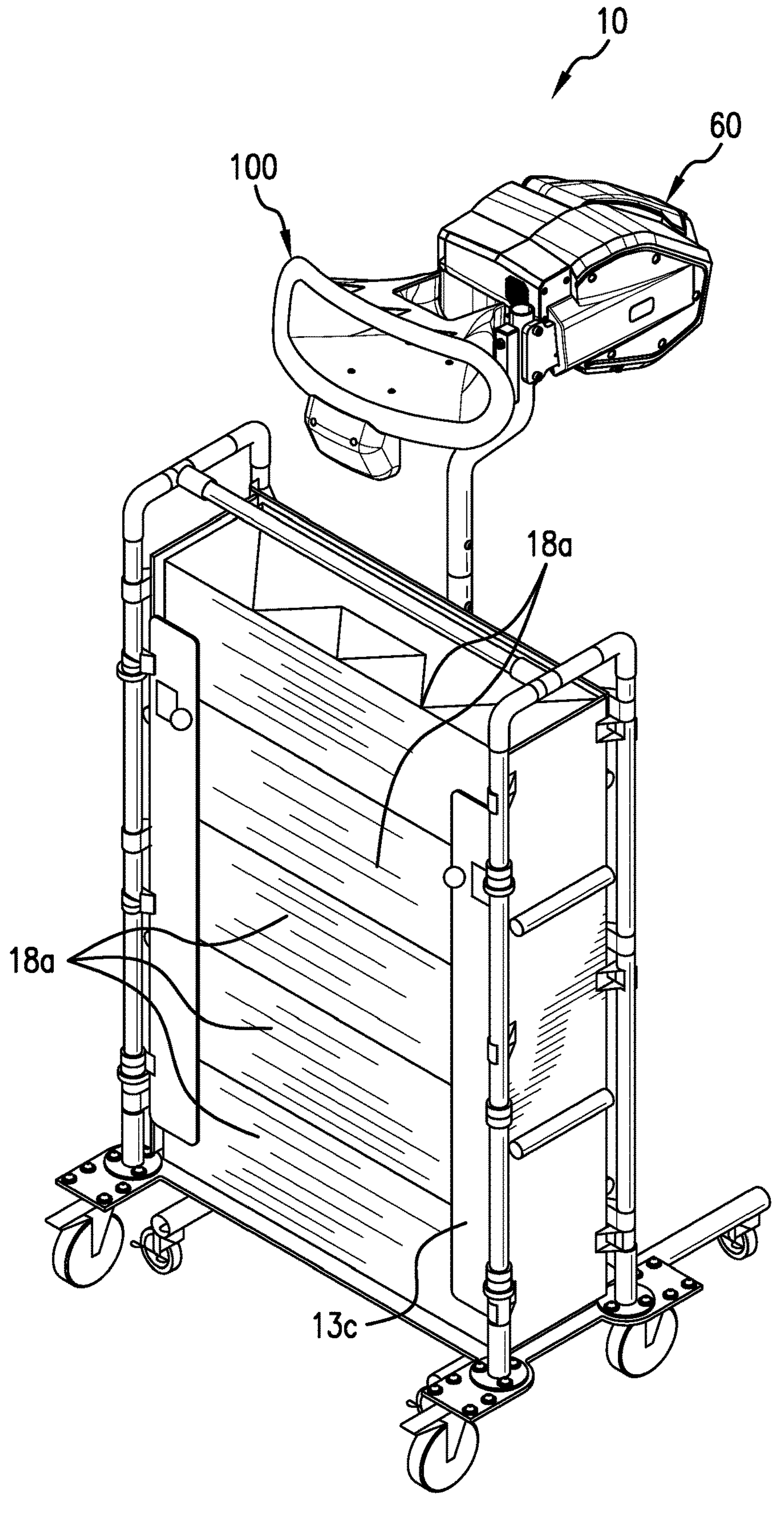
Figure 25D:
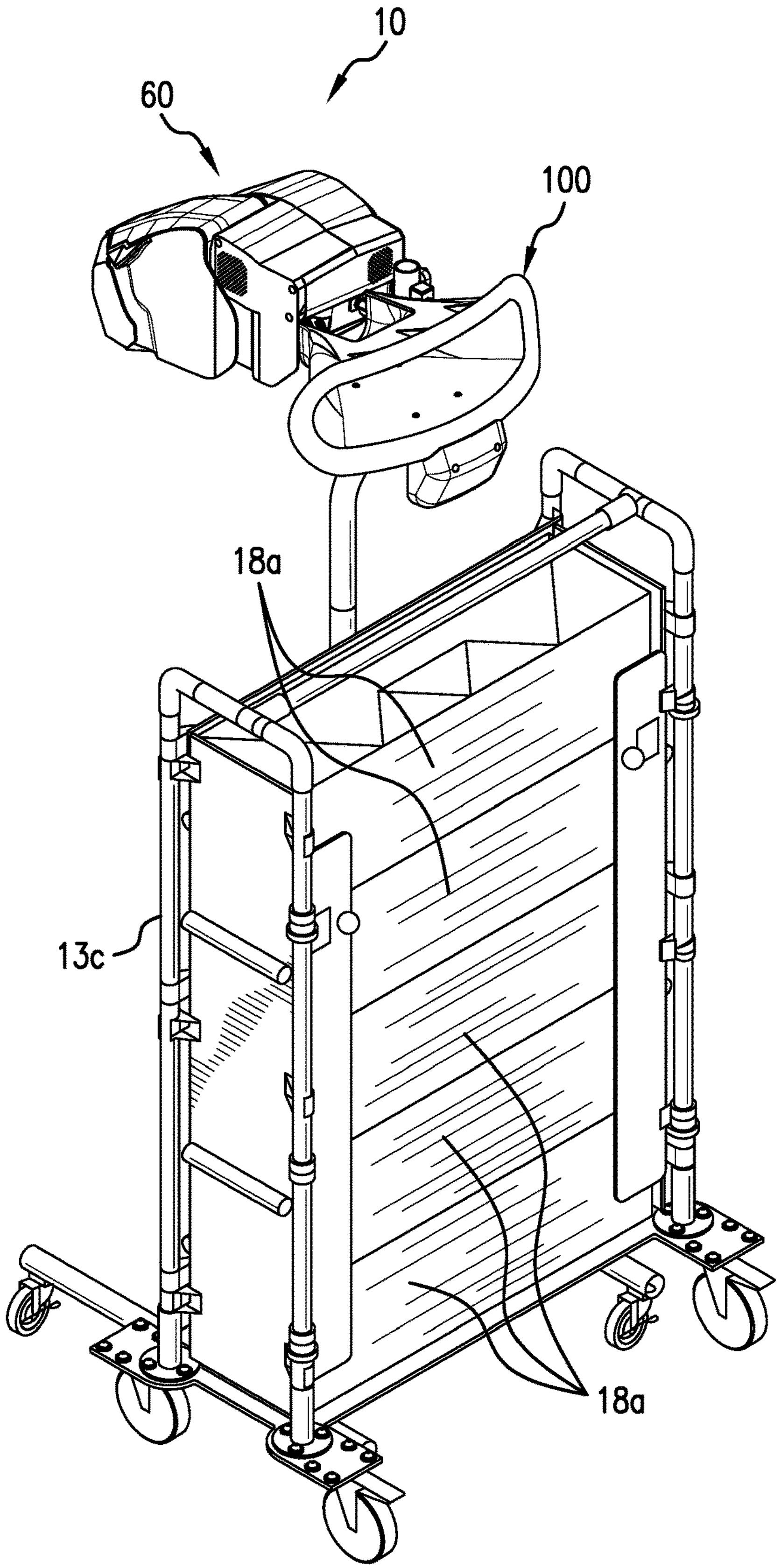

The stock material 19 is converted to the dunnage 15 by following a material path A through the system 10. The material path A is denoted in FIGS. 19-21. The material path A has an inlet end where the stock material 19 is fed into the system 10, and an outlet end where the dunnage 15 exits the system 10.

The dunnage conversion machine 60 includes an enclosure 61; the intake 100; an outlet chute 62; a cutting motor assembly 201; and a feed motor 301 extending from the enclosure 61.

Figure 4:
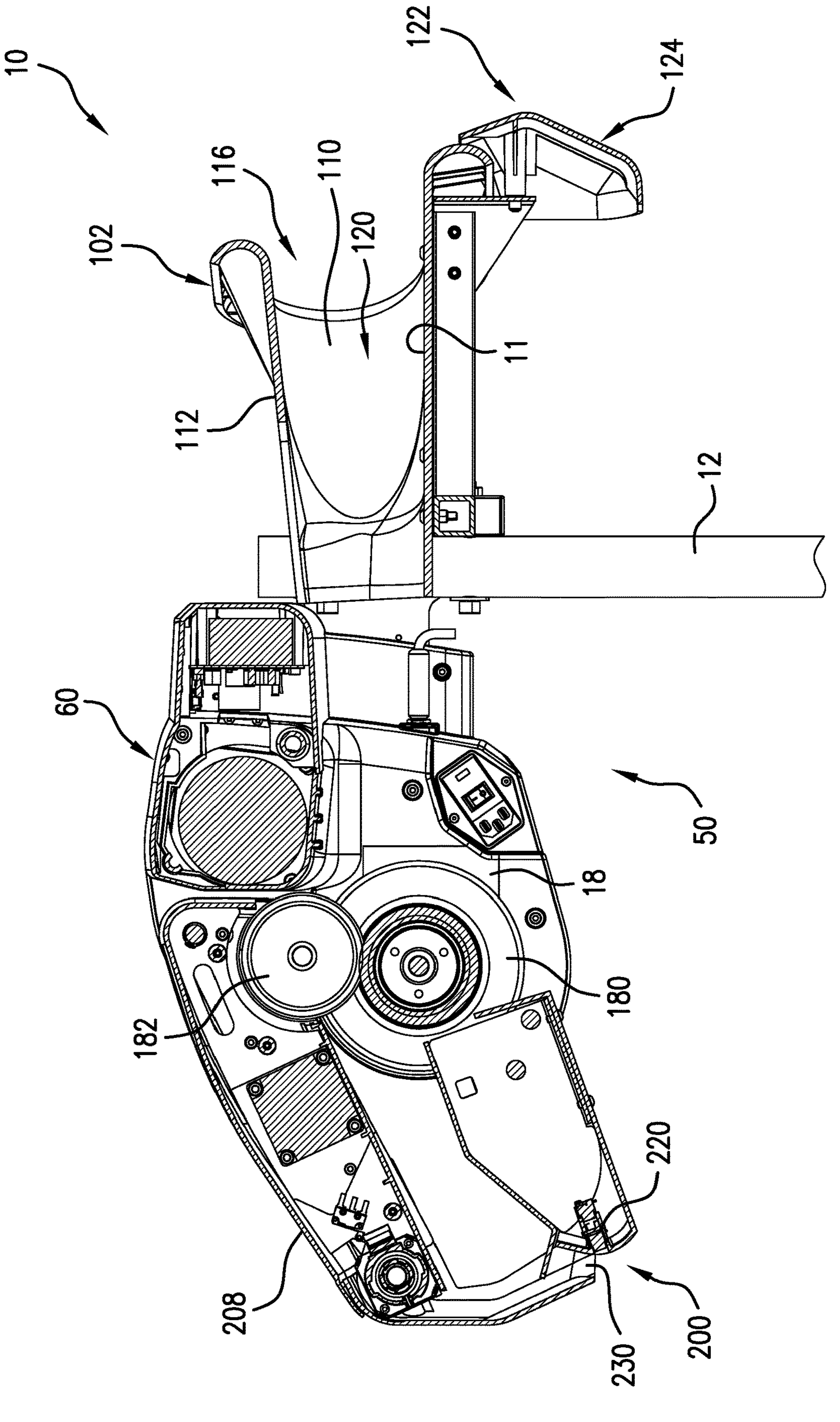
FIG. 4 is a cross-sectional view of the system shown in FIGS. 1-3, taken through the line IV-IV of FIG. 7, and depicting the grip in the closed position.
Figure 5:
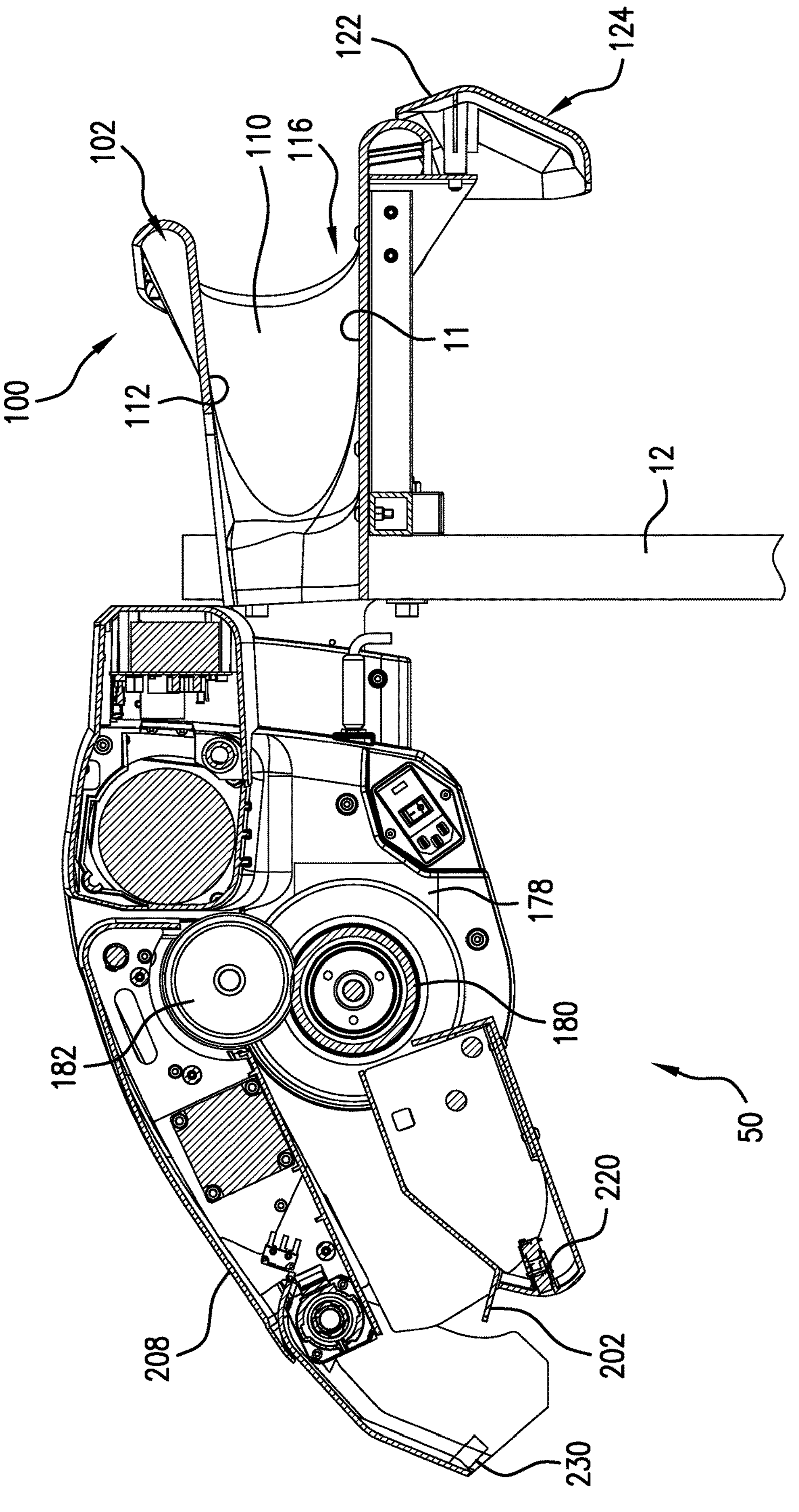
FIG. 5 is a cross-sectional view of the system shown in FIGS. 1-4, taken through the line "A-A" of FIG. 7, and depicting the grip in the open position.

The intake 100 comprises an inlet chute 102. The inlet chute 102 includes two side panels 110, a top panel 112, and a bottom panel 114, as shown in FIGS. 4 and 5. Each side panel 112 adjoins a respective side of the top panel 112 and a respective side of the bottom panel 114. The intake 100 defines an inlet 116 and an outlet 118. The inlet chute 102 is attached to a rearward end of the dunnage conversion machine 60, so that the outlet 118 aligns with an inlet of the dunnage conversion machine 60 as shown in FIGS. 10-14. The inlet chute 102 can be attached to the dunnage conversion machine 60 by a suitable means such as fasteners.

The inlet chute 102 defines a portion of the material path A for the stock material 19. In particular, the side panels 110, top panel 112, and bottom panel 114 define a passage 120 that extends between the inlet 116 and the outlet 118 of the inlet chute 102. The stock material 19 enters the passage 120 by way of the inlet 116. The stock material 19 is drawn through the passage 120 until it reaches the outlet 118, at which point the stock material 19 exits the inlet chute 102 and enters the dunnage conversion machine 60.

The side panels 110 of the inlet chute 102 angle inwardly along the length of the intake, so that the width of the passage 120 decreases between the inlet 116 and the outlet 118. For example, the width of the passage 120 can be about equal to the initial width of the stock material 19. As the stock material 19 is drawn through the passage 120, the angled orientation of the side panels 110, visible in FIGS. 10-14, causes the side panels 110 to push the opposing sides of the stock material 19 toward each other, which in turn cause the stock material to crumple and undergo a decrease in its overall width prior to exiting the intake via the outlet 118.

Figure 11:
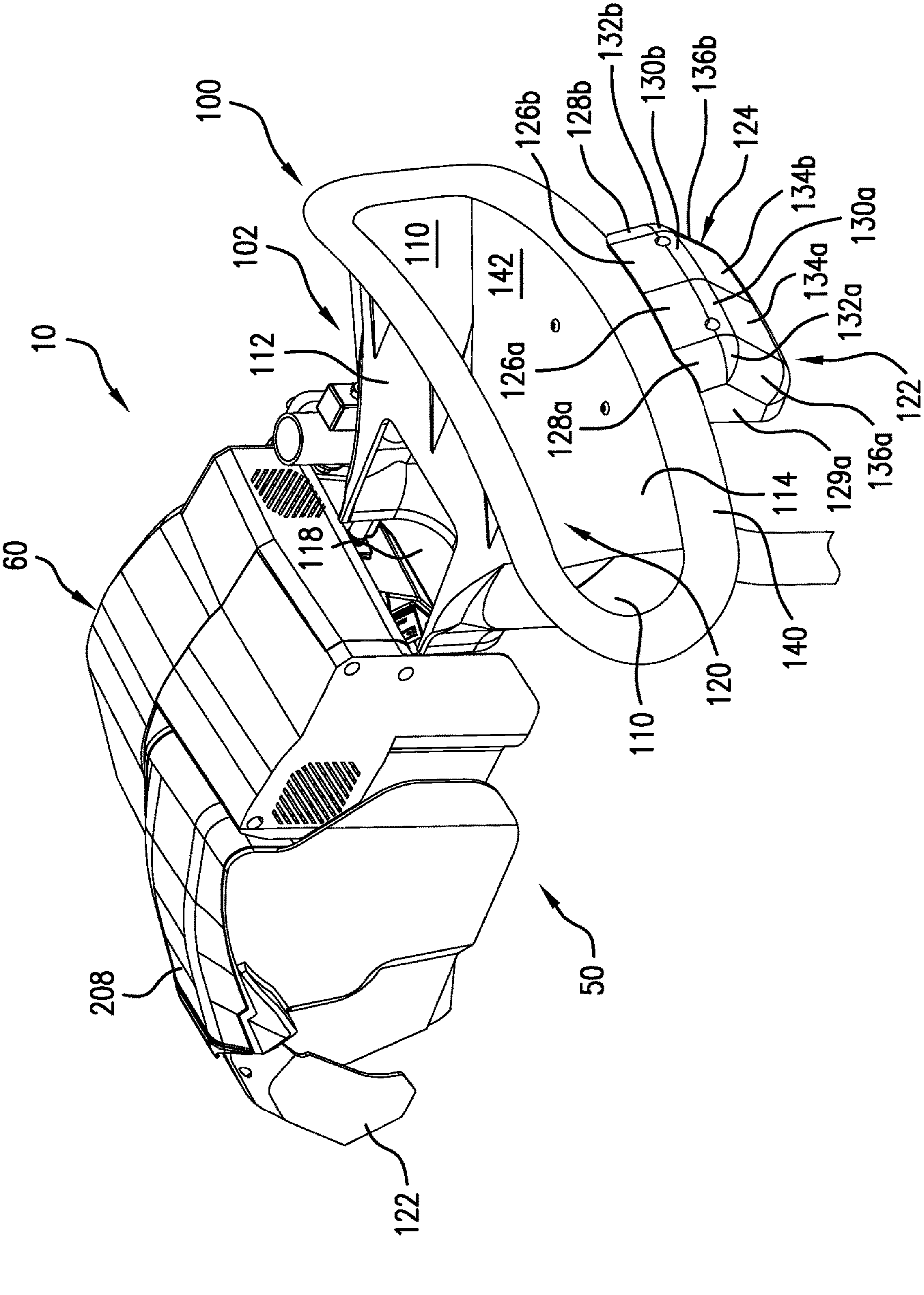
FIG. 11 is a top-rear perspective view of the system shown in FIGS. 1-10, depicting the grip in the open position.
Figure 12:
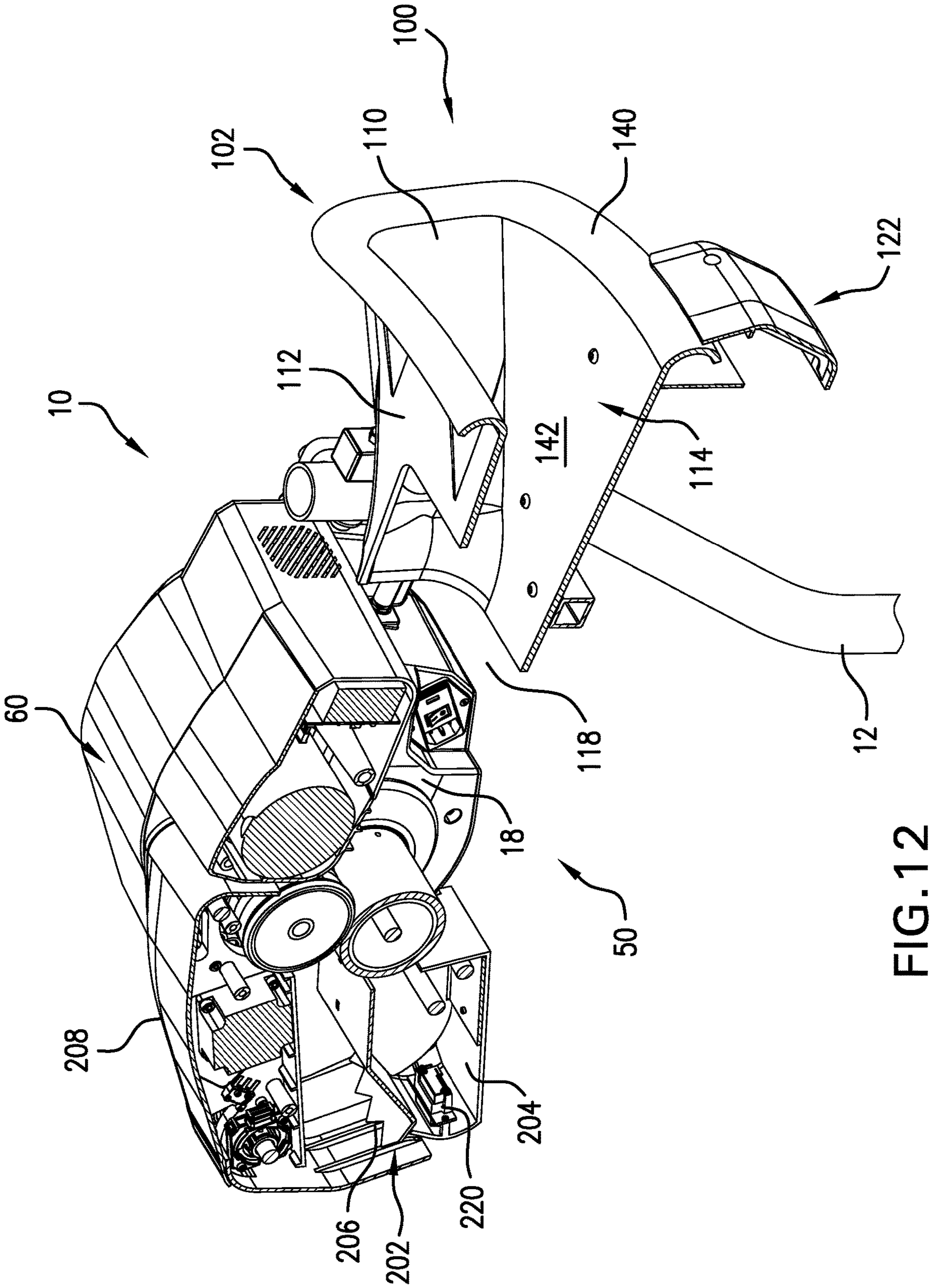
FIG. 12 is a cross-sectional view of the system shown in FIGS. 1-11, taken through line "IV-IV" of FIG. 7, and depicting the grip in the closed position.
Figure 13:
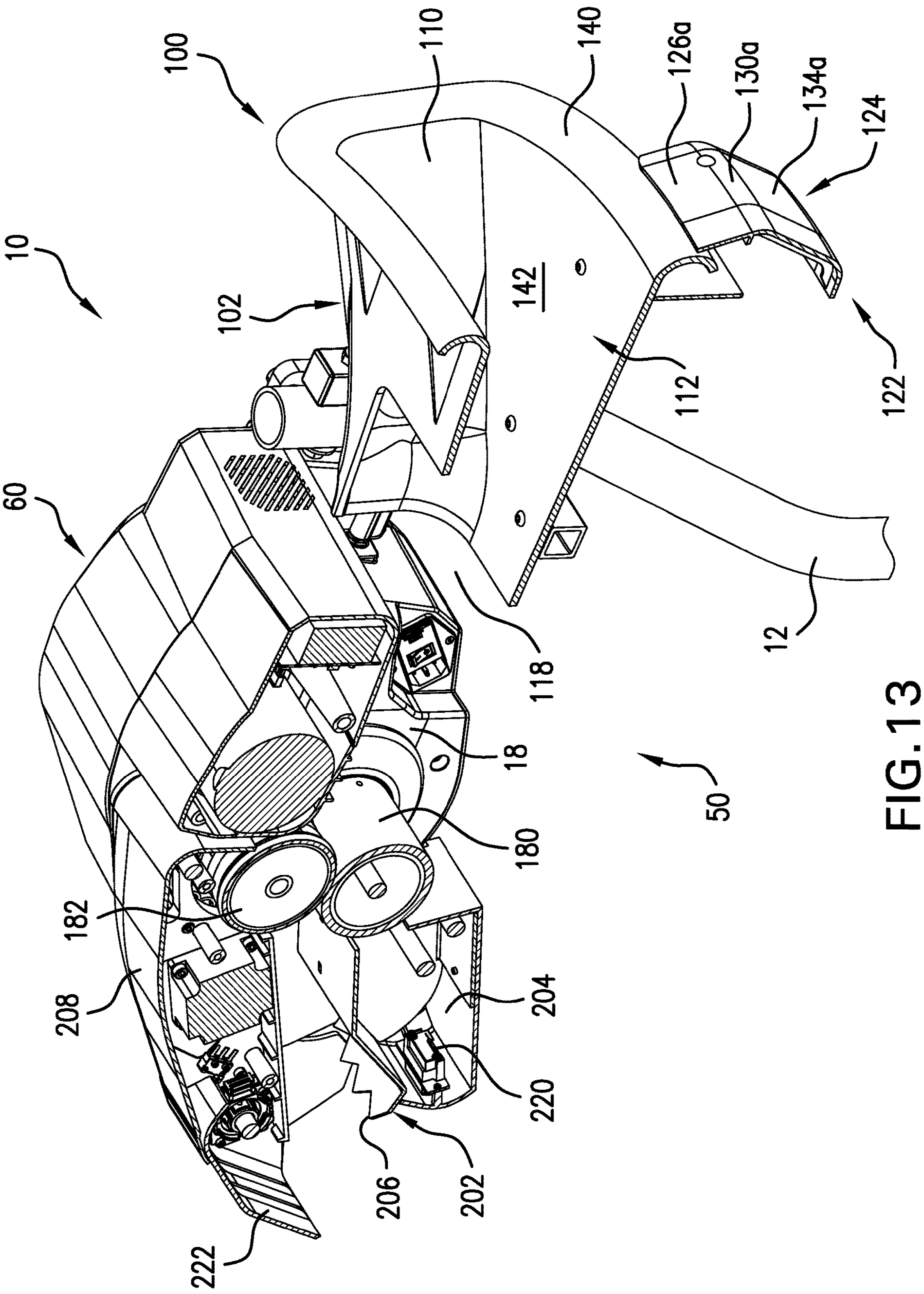
FIG. 13 is a cross-sectional view of the system shown in FIGS. 1-12, taken through line "IV-IV" of FIG. 7, and depicting the grip in the open position.
Figure 14:
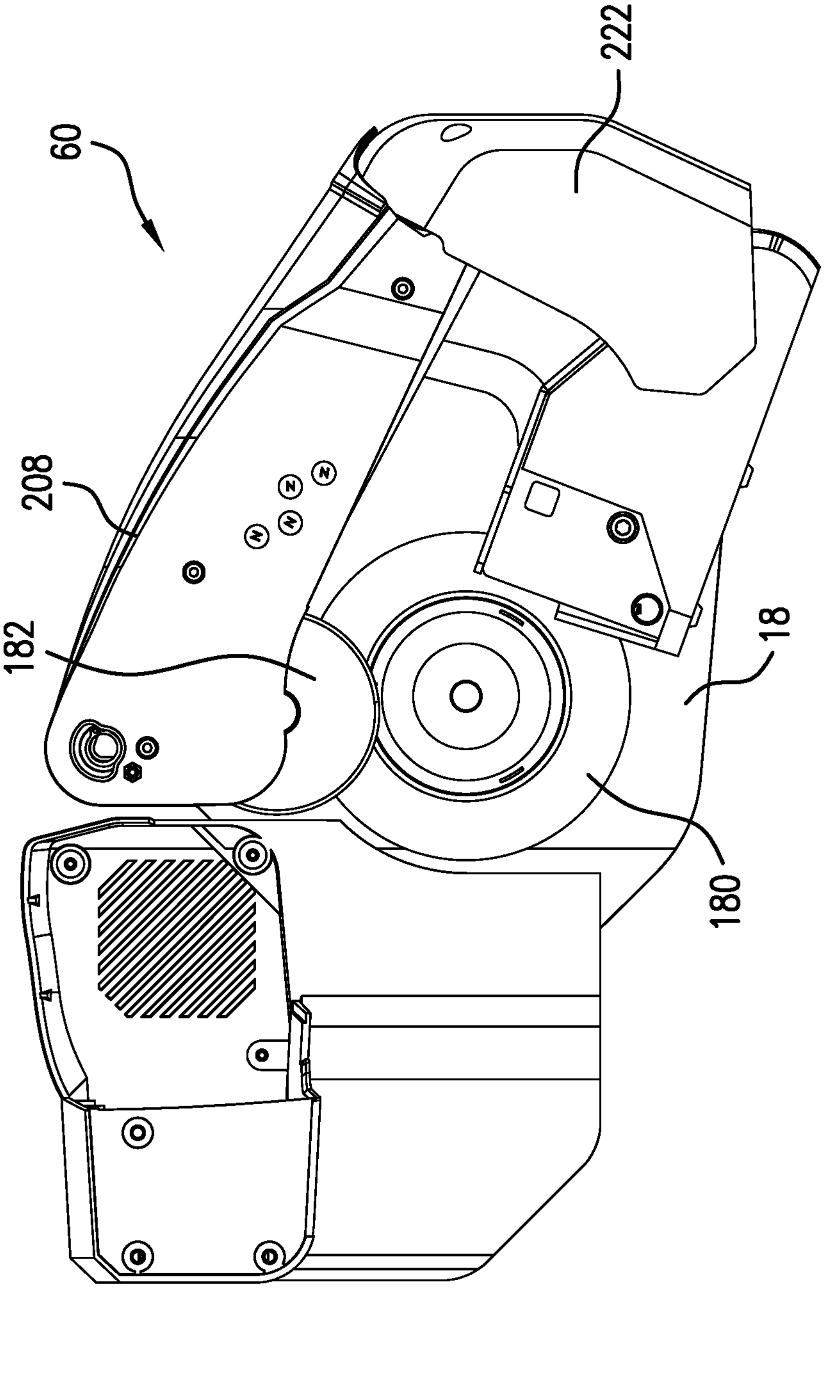
FIG. 14 is side view of a dunnage conversion machine of the system shown in FIGS. 1-13, with a sidewall of the dunnage conversion machine removed for clarity of illustration, and depicting the grip in the closed position.
Figure 15:
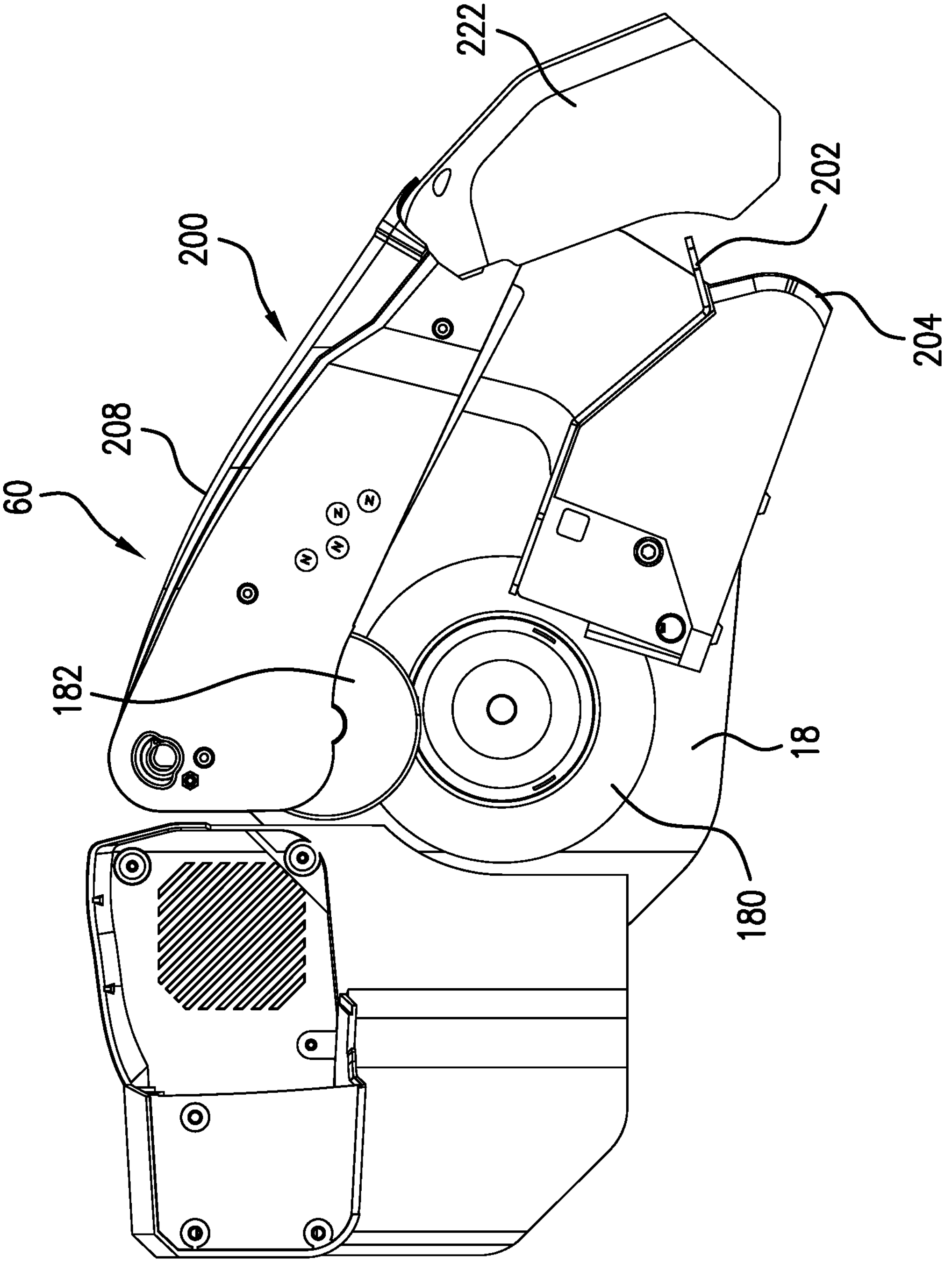
FIG. 15 is a side view of the dunnage conversion machine shown in FIG. 14, with the sidewall removed, and depicting the grip in the open position.

Referring to FIG. 11, the intake 100 also includes a protrusion, or projection 122. The projection 122 is attached to the bottom panel 114 of the inlet chute 102, by a suitable means such as fasteners. The projection 122 and the bottom panel 114 can be unitarily formed in alternative embodiments. The projection 122 is attached to a rearward end of the bottom panel 114, i.e., to the end of the bottom panel 114 proximate the inlet 116. The projection 122 extends downward from the bottom panel 114.

The projection 122 is symmetrically disposed about the longitudinal centerline of the intake 100, with respect to the transverse, or side to side direction of the intake 100. The projection 122 has a width, or side to side dimension, that is substantially less than the width of the passage 120.

The projection 122 includes a faceted surface 124. The faceted surface 124 faces generally outward, away from the inlet chute 102, and is configured to contact and slightly bend the stock material 19 the before the stock material 19 enters the inlet chute 102.

The faceted surface 124 includes two substantially planar upper surface portions 126*a*, 126*b*. The upper surface portions 126*a*, 126*b* adjoin each other, and are symmetrically disposed about the transverse, or side to side centerline of the projection 122. The upper surface portions 126*a*, 126*b* are angled toward the direction of travel of the paper stock 19 through the inlet chute 102. Also, the upper surface portions 126*a*, 126*b* are angled in relation to each other, so that the upper surface portions 126*a*, 126*b* slope away from each other.

The faceted surface 124 also includes two upper end portions 128*a*, 128*b*. The upper end portions 128*a*, 128*b* each have a curved profile. The upper end portion 128*a* adjoins the upper surface portion 126*a*. The upper end portion 128*a* also adjoins a first side 129*a* of the projection 122. The upper end portion 128*b* adjoins the upper surface portion 126*b*. The upper end portion 128*b* also adjoins a second side 129*b* of the projection 122.

The faceted surface 124 further includes two intermediate surface portions 130*a*, 130*b*. The intermediate surface portions 130*a*, 130*b* adjoin each other, and are symmetrically disposed about the transverse centerline of the projection 122. Also, the intermediate surface portions 130*a*, 130*b* each adjoin a lower edge of the respective upper surface portions 126*a*, 126*b*. The intermediate surface portions 130*a*, 130*b* each have a rounded, outwardly curved profile.

The faceted surface 124 also includes two intermediate end portions 132*a*, 132*b*. The intermediate end portions 132*a*, 132*b* each have a curved profile. The intermediate end portion 132*a* adjoins the intermediate surface portion 130*a*. The intermediate end portion 132*a* also adjoins the first side 129*a* the of the projection 122. The intermediate end portion 132*b* adjoins the intermediate surface portion 130*b*. The intermediate end portion 132*b* also adjoins the second side 129*b* of the projection 122.

The faceted surface 124 further includes two substantially planar lower surface portions 134*a*, 134*b*. The lower surface portions 134*a*, 134*b* adjoin each other, and are symmetrically disposed about the transverse centerline of the projection 122. Also, the lower surface portions 134*a*, 134*b* each adjoin a lower edge of the respective intermediate surface portions 130*a*, 130*b*. The lower surface portions 134*a*, 134*b* are angled toward the direction of travel of the paper stock 19 through the inlet chute 102. Also, the lower surface portions 134*a*, 134*b* are angled in relation to each other, so that the lower surface portions 134*a*, 134*b* slope away from each other.

The faceted surface 124 also includes two lower end portions 136*a*, 136*b*. The lower end portions 136*a*, 136*b* each have a curved profile. The lower end portion 136*a* adjoins the lower surface portion 134*a*. The lower end portion 136*a* also adjoins the first side 129*a* the of projection 122. The lower end portion 136*b* adjoins the lower surface portion 134*b*. The lower end portion 136*b* also adjoins the second side 129*b* of the projection 122.

A central portion of the stock material 19 that is aligned with the projection 122 passes over, and is bent by the faceted surface 124 as the stock material 19 is drawn from the supply station 13 and into the input chute 102. In particular, a centrally located portion of the stock material 19 passes over the lower surface portions 134*a*, 134*b* and the lower end portion 136*a*, 136*b* in a substantially flat state. This portion of the stock material 19 then passes over the intermediate surface portions 130*a*, 130*b* and the intermediate end portions 132*a*, 132*b*, and undergoes a change in direction due to the curved profile of the intermediate surface portions 130*a*, 130*b* and the intermediate end portions 132*a*, 132*b*. This change in direction causes the stock material 19 to bend. The centrally-located portion of the stock material 19 subsequently returns to a substantially flat state as it is drawn over the upper surface portions 126*a*, 126*b* and the upper end portion 128*a*, 128*b*. The bending of the stock material 19 in this manner can make the stock material 19 more pliable for conversion into dunnage in the dunnage conversion machine 60.

Figure 19:
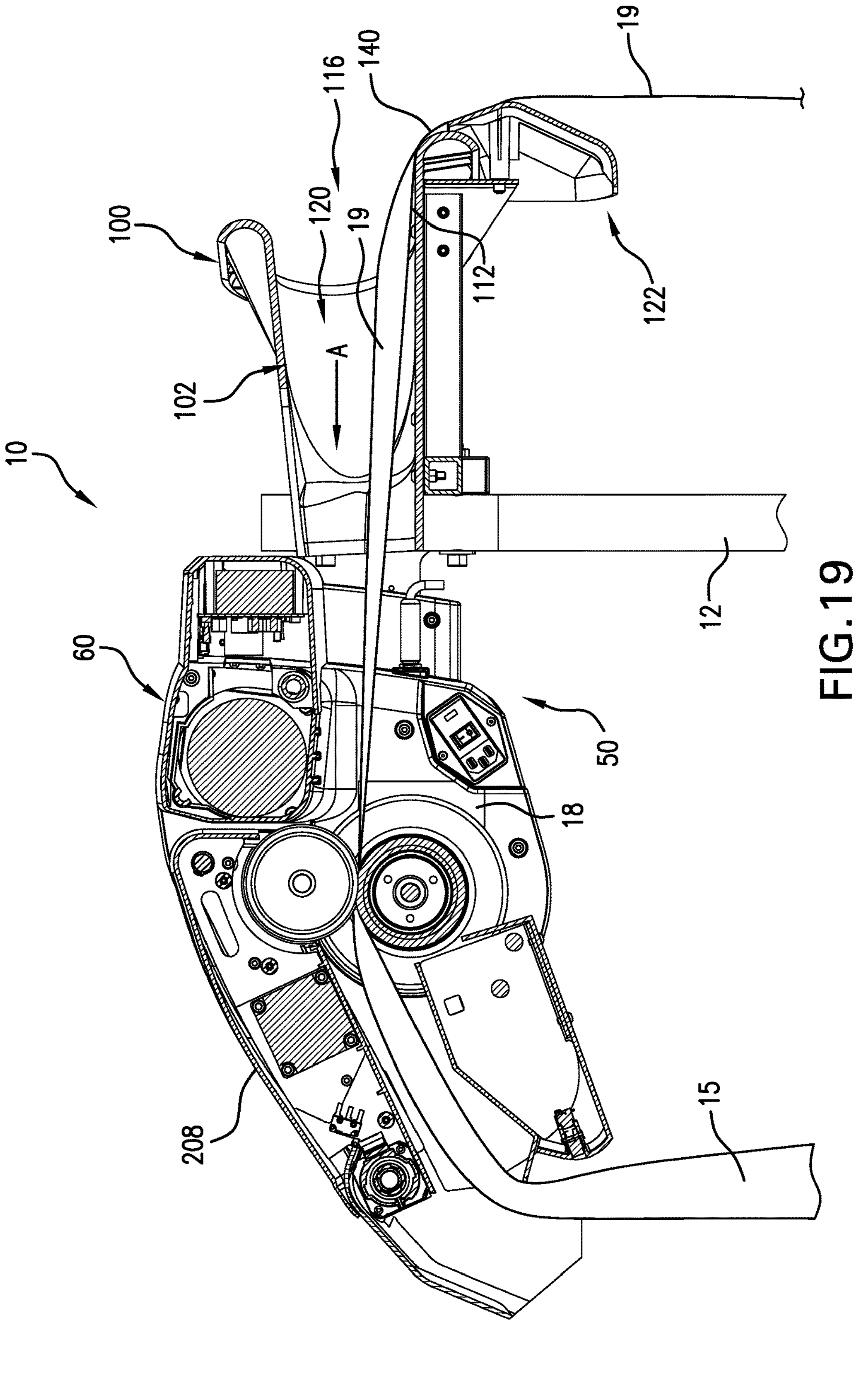
FIG. 19 is a cross-sectional view of the system shown in FIGS. 1-18, taken through the line "IV-IV" of FIG. 7, and depicting stock material being converted to dunnage, before the dunnage has been cut.

As shown in FIG. 19, the stock material 19 subsequently is drawn over a curved lip 140 that defines a leading edge of the bottom panel 114, and then enters the passage 120 within the inlet chute 102. The stock material 19 then is drawn over a substantially planar surface 142 of the bottom panel 114. As noted above, the side panels 110 are angled inwardly, so that the width of the passage 120 decreases between the inlet 116 and the outlet 118 of the inlet chute 102. This decrease in width, combined with the increased pliability of the stock material 19 resulting from the bending of the stock material 19 over the projection 122, cause the stock material 19 to undergo a decrease in width, which in turn causes the stock material 19 to crumple and develop folds along its lengthwise direction, thereby producing a continuous length of the dunnage 15.

In alternative embodiments, the faceted surface 124 can have a shape other than the specific shape described herein. In other alternative embodiments, a non-faceted surface can be used in lieu of the faceted 124.

As used herein, the term "substantially planar surface" can refer to a surface that is so smooth as to be seemingly completely flat. For example, a "substantially planar surface" can be a completely flat surface. Also, a substantially planar surface" can be a surface having a large radius of curvature, e.g., ten feet or more.

The dunnage conversion machine 60 includes a frame 178, a first roller 180, and a second roller 182. The dunnage conversion machine 60 also includes a drive motor (not shown) housed within a motor housing 186 and supported by the frame 178.

The stock material 19 passes between, and is moved along the material path A by the first roller 180 and the second roller 182. The second roller 182 is idle, i.e., is not driven directly by a motor. The second roller 182 is spring biased toward the first roller 180, so that the stock material 19 is pinched between the first roller 180 and the second roller 182, and the resulting friction between the rotating first roller 180 and the stock material 19 moves the stock material 19 along the material path. Also, the pressure exerted by the first roller 180 and the second roller 182 on the stock material 19 forms creases in the stock material along the folds formed in the intake 100. The drive motor is reversible, so that the direction of travel of the stock material 19 through the dunnage conversion machine 60 can be reversed.

Alternative embodiments of the system 10 can be equipped with devices that convert the stock material 19 to dunnage 15 using hardware other than rollers, such as a paper crumpler.

Figure 6:
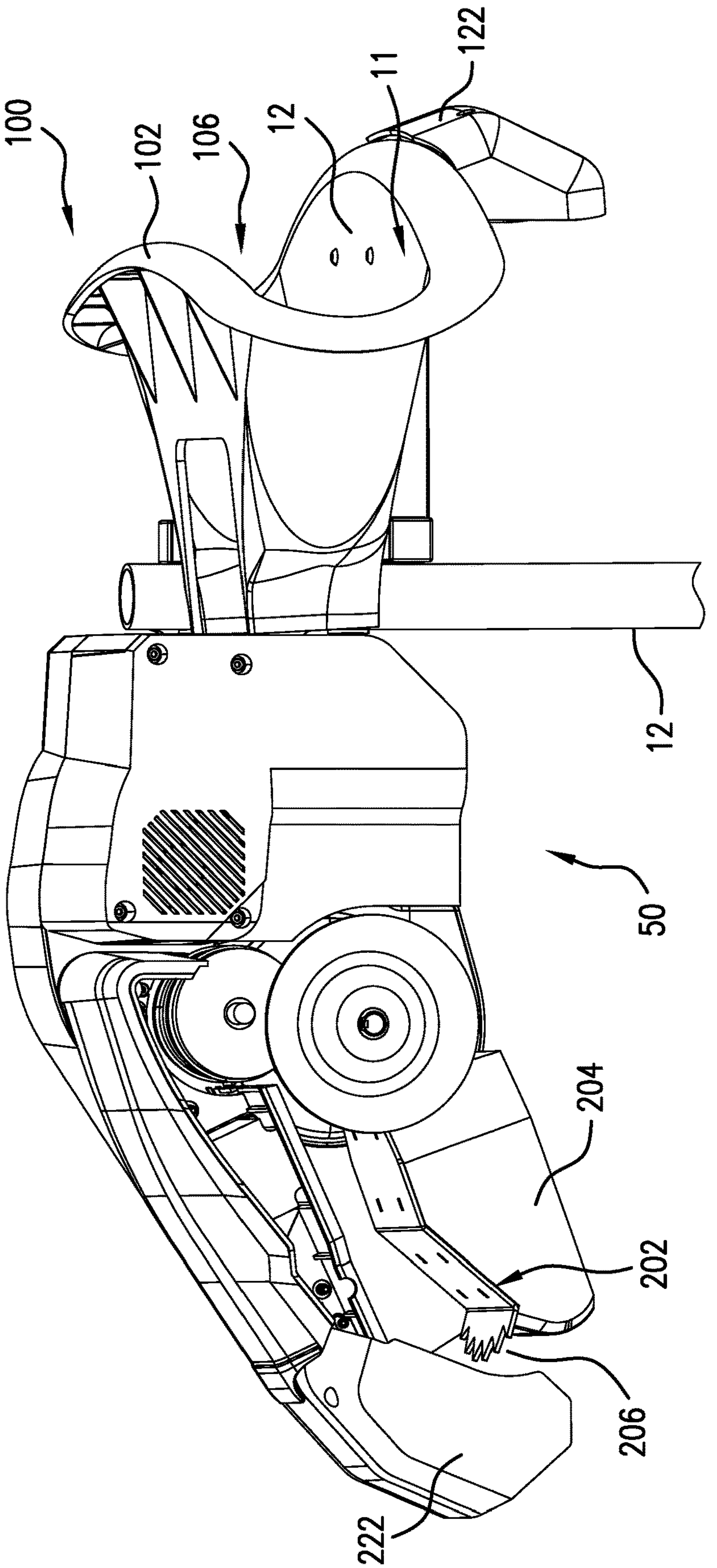
FIG. 6 is a top-front perspective view of the system shown in FIGS. 1-5, with a first sidewall of a hood of the system removed for clarity of illustration.
Figure 7:
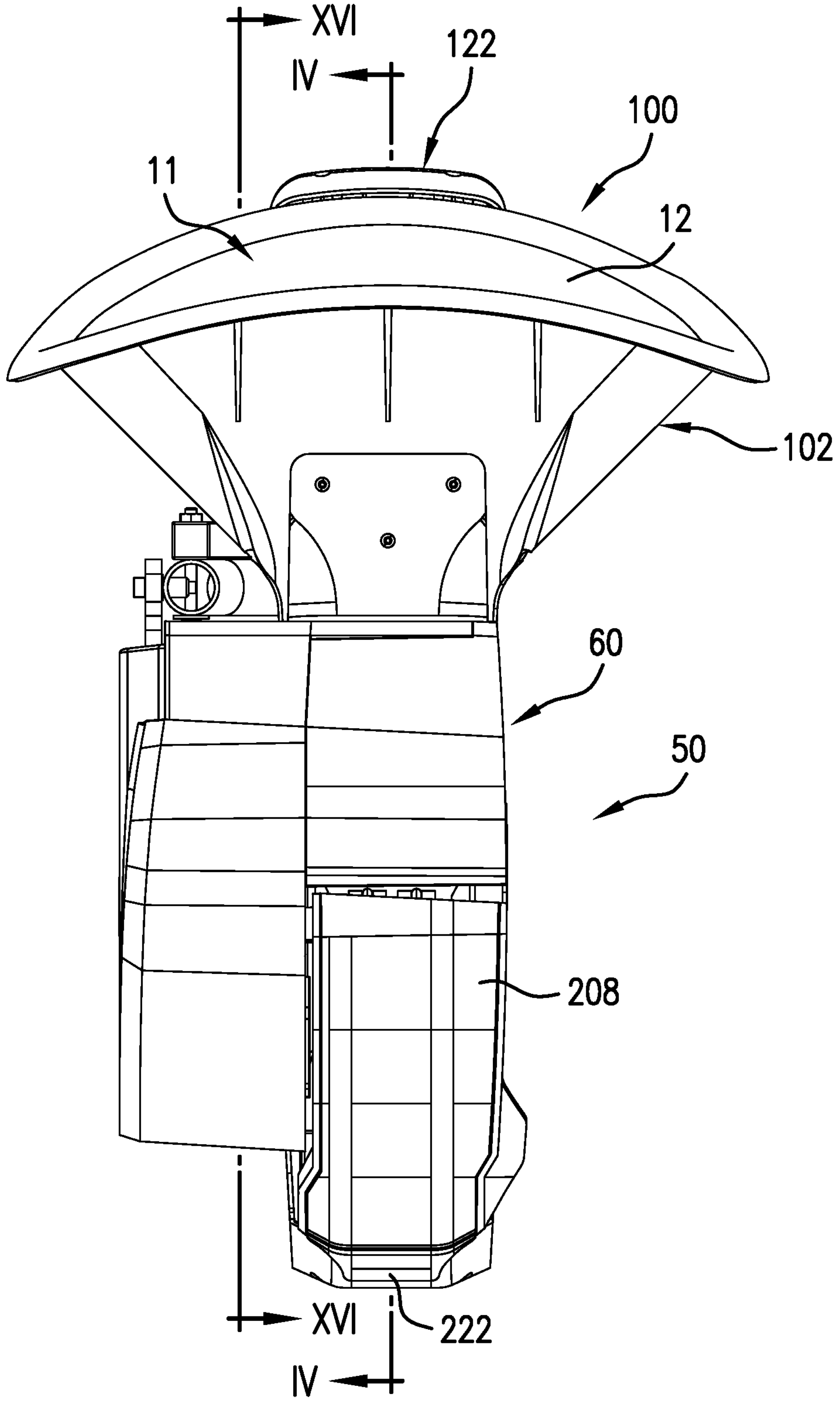
FIG. 7 is a top view of the system shown in FIGS. 1-6.
Figure 8:
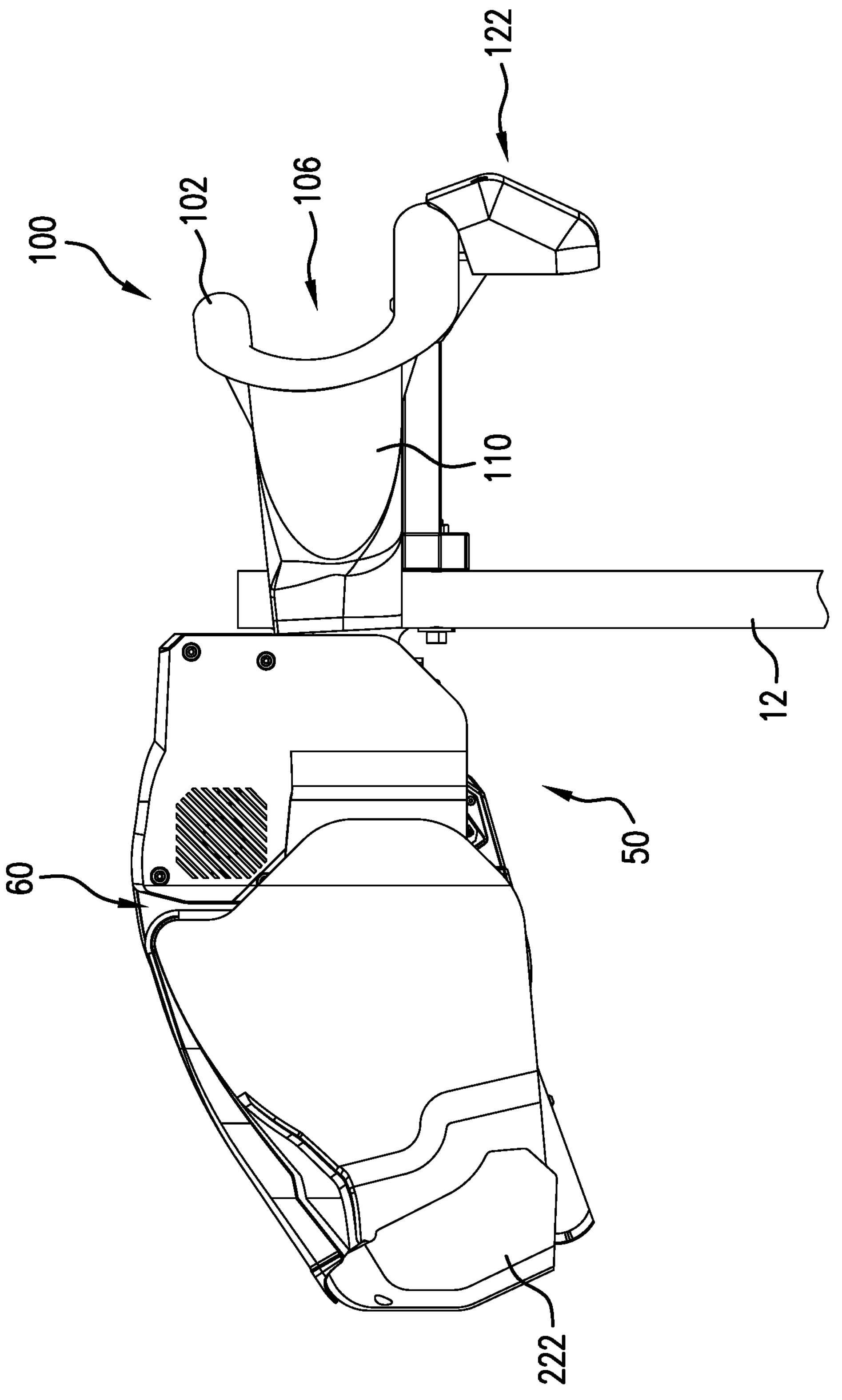
FIG. 8 is a side view of the system shown in FIGS. 1-7, depicting a hood of the system in a closed position.
Figure 9:
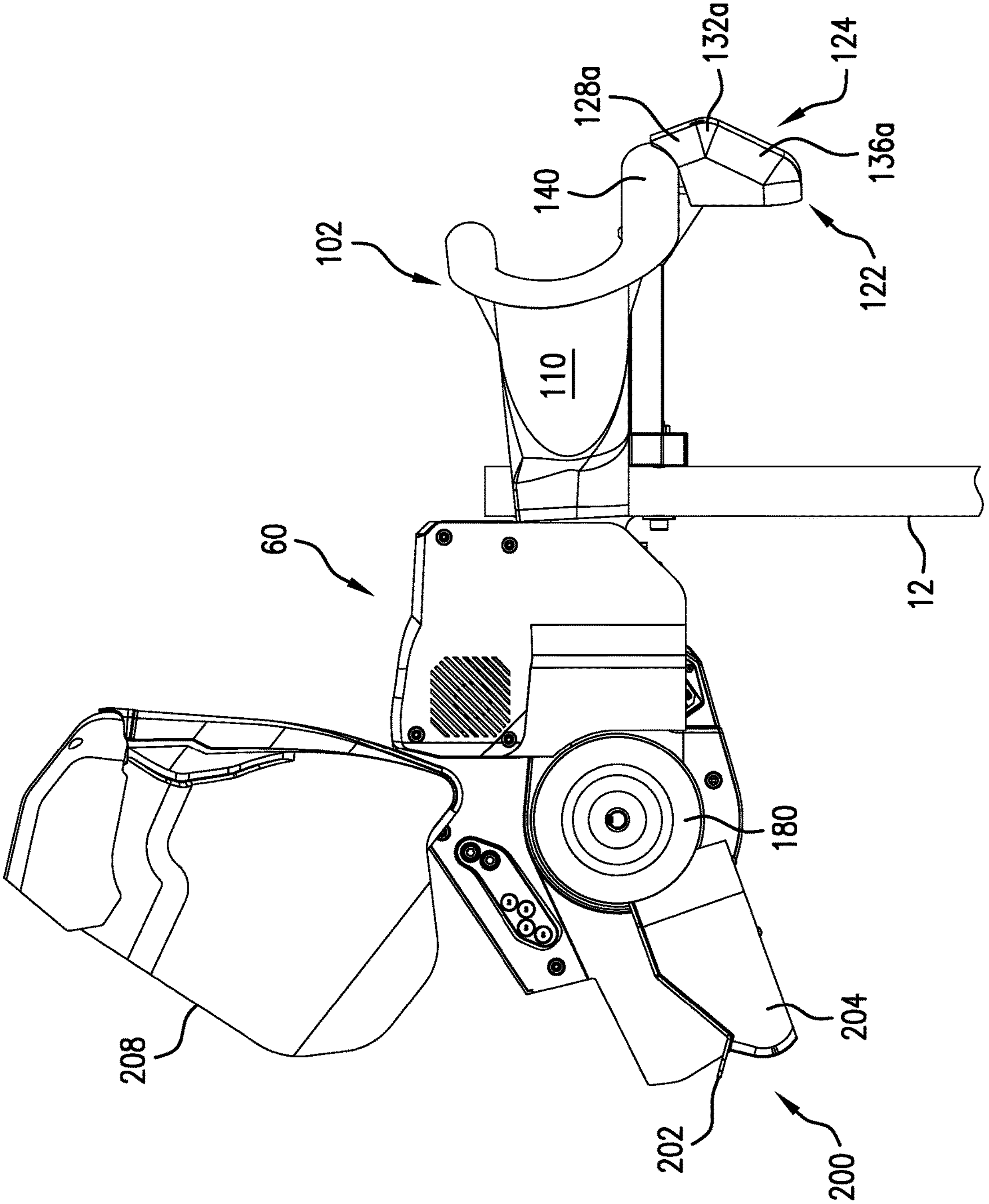
FIG. 9 is a side view of the system shown in FIGS. 1-8, depicting the hood in an open position.
Figure 10:
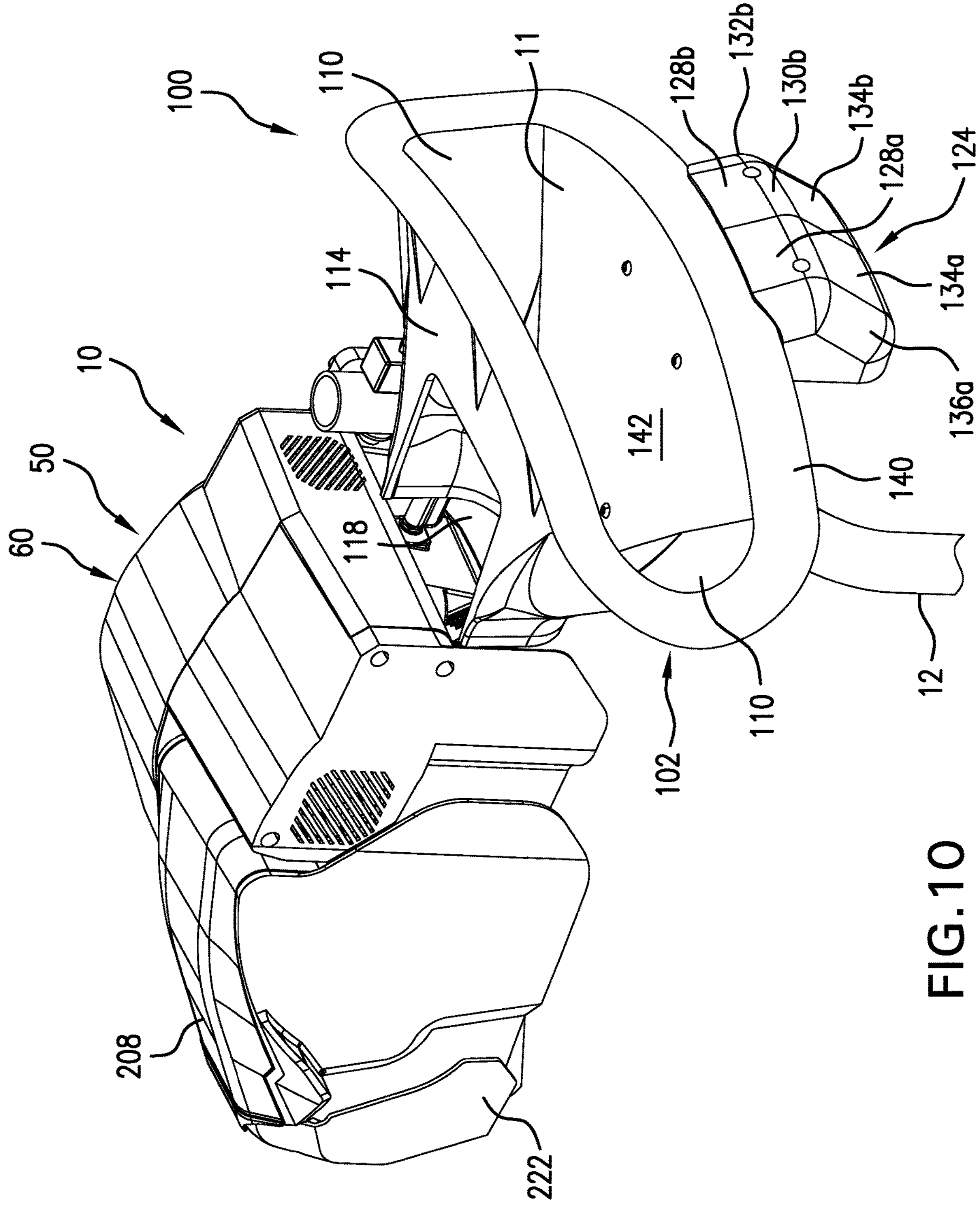
FIG. 10 is a top-rear perspective view of the system shown in FIGS. 1-9, depicting the grip in the closed position.

Referring to FIGS. 3-6 and 14-17, the dunnage conversion machine 60 also includes a cutting mechanism 200 comprising a cutting device in the form of a blade 202, and a housing 204. The housing 204 is coupled to the frame 178, and supports the blade 202. The blade 202 has a serrated cutting edge 206, as shown in FIG. 6. The cutting edge 206 can have other shapes in alternative embodiments. The blade 202 is angled in the direction of the material path A.

In alternative embodiments, the cutting device can have a configuration other than the blade 202. For example the cutting device be configured as a wire, a knife, or another type of cutting provision in alternative embodiments.

The cutting mechanism 200 also includes a duckbill or hood 208. A first end of the hood 208 is coupled to the frame 178 by a pin or other suitable means, so that the hood 208 can pivot in relation to the frame 178 and the blade 202 between a lowered or closed position depicted in FIGS. 4, 14, and 16, and a raised or open position depicted in FIGS. 3, 5, 6, 15, and 17.

The second roller 182 is mounted for rotation on the hood 208. The second roller 182 and is positioned on the hood 208 so that the second roller 182 contacts the first roller 180 when the hood is in the closed position. A user can load the stock material 19 can into the dunnage conversion machine 60 by lifting the hood 208 is its open position, placing a leading end of the stock material 19 on the first roller 180, and then lowering the hood 208 to its closed position so that the stock material 19 is pinched between the first roller 180 and the second roller 182.

The cutting mechanism 200 further includes a grip 222. An end of the grip 222 is coupled to the freestanding end of the hood 208 by a pin or other suitable means that permits the grip 222 to rotate between a raised or open position, and a lowered or closed position.

Figure 16:
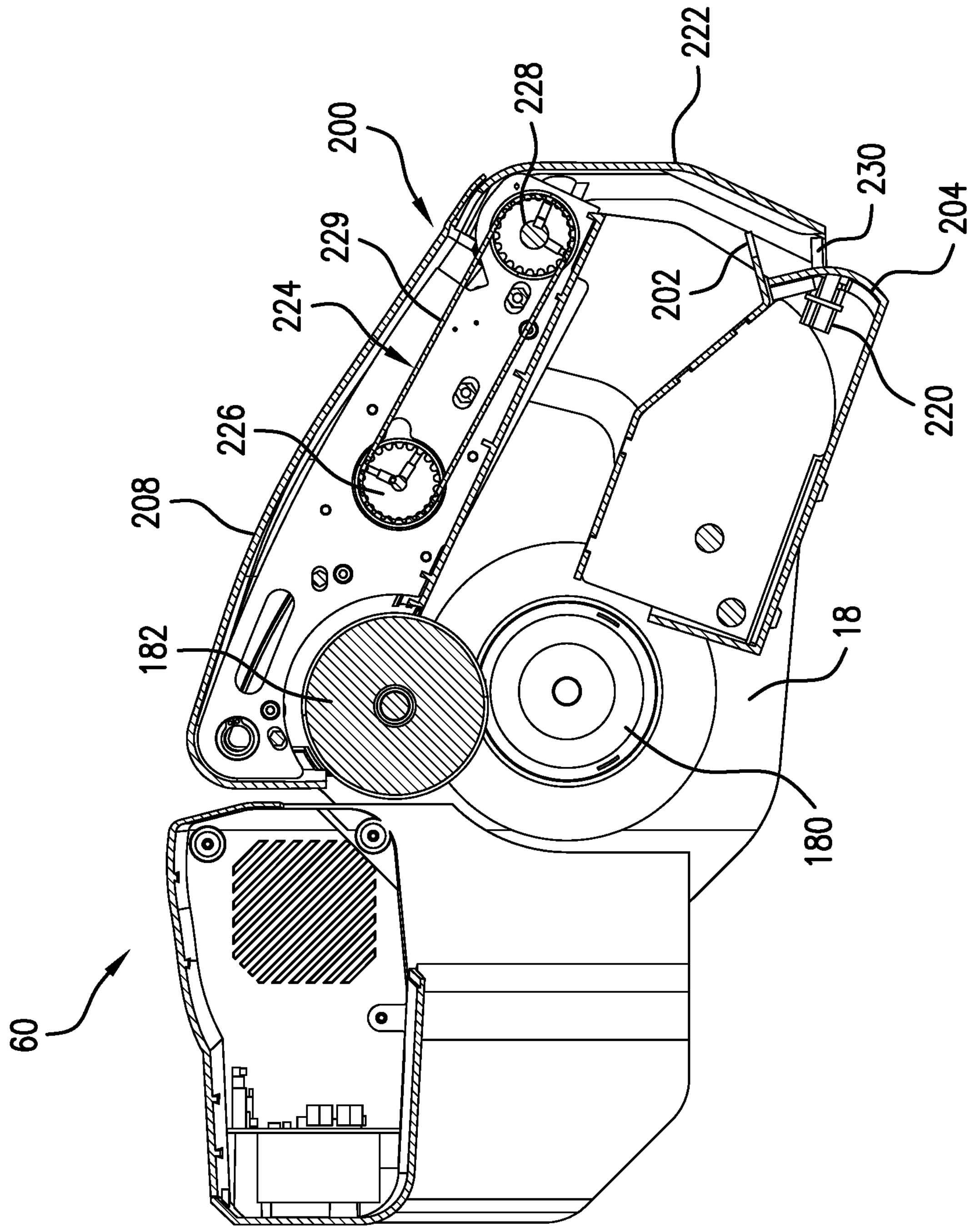
FIG. 16 is a cross-sectional view of the dunnage conversion machine shown in FIGS. 14 and 15, taken through the line XVI-XVI of FIG. 7, and depicting the grip in the closed position.
Figure 17:
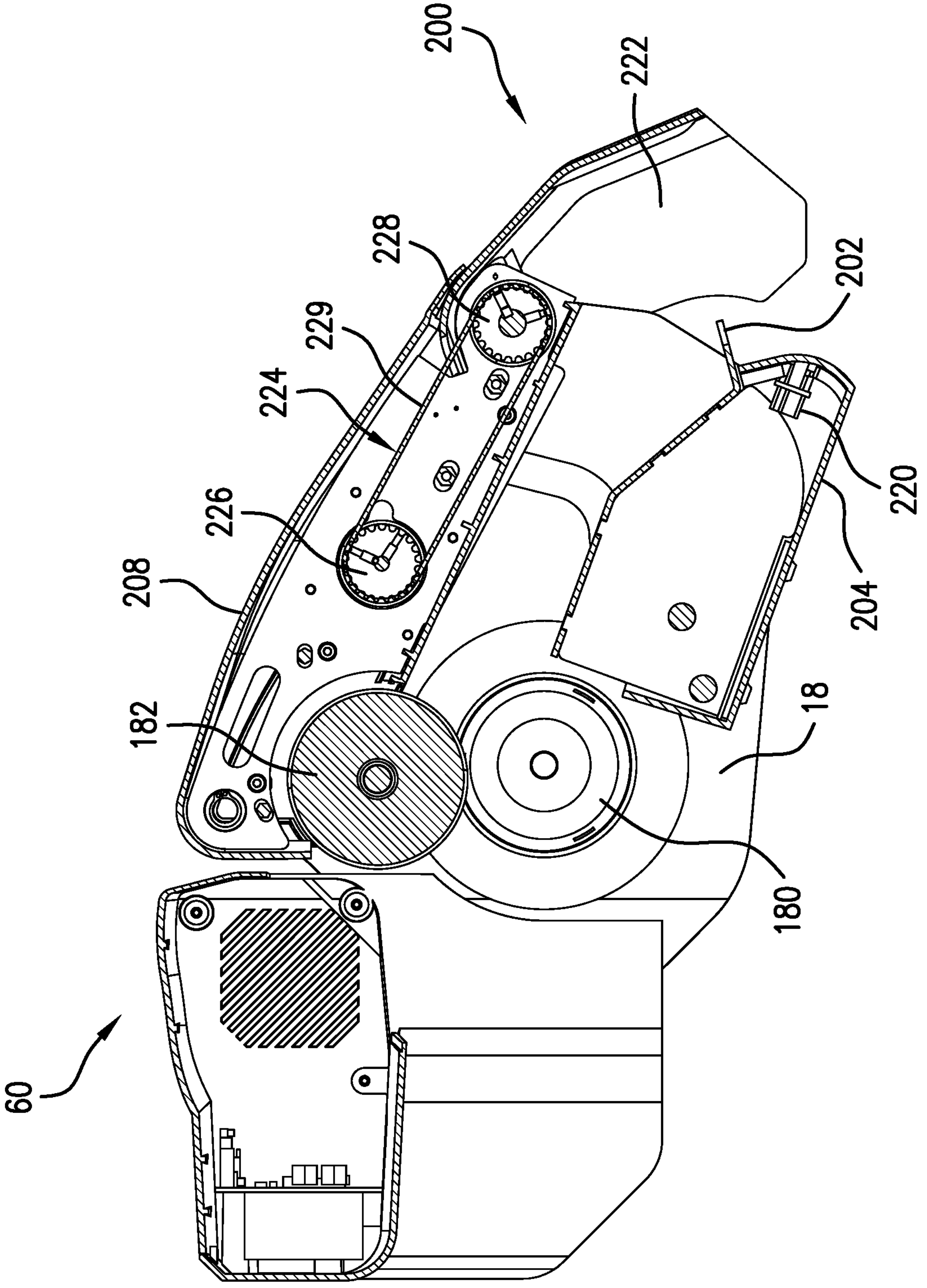
FIG. 17 is a cross-sectional view of the dunnage conversion machine shown in FIGS. 14-16, taken through the line XVI-XVI of FIG. 7, and depicting the grip in the open position.
Figure 18:
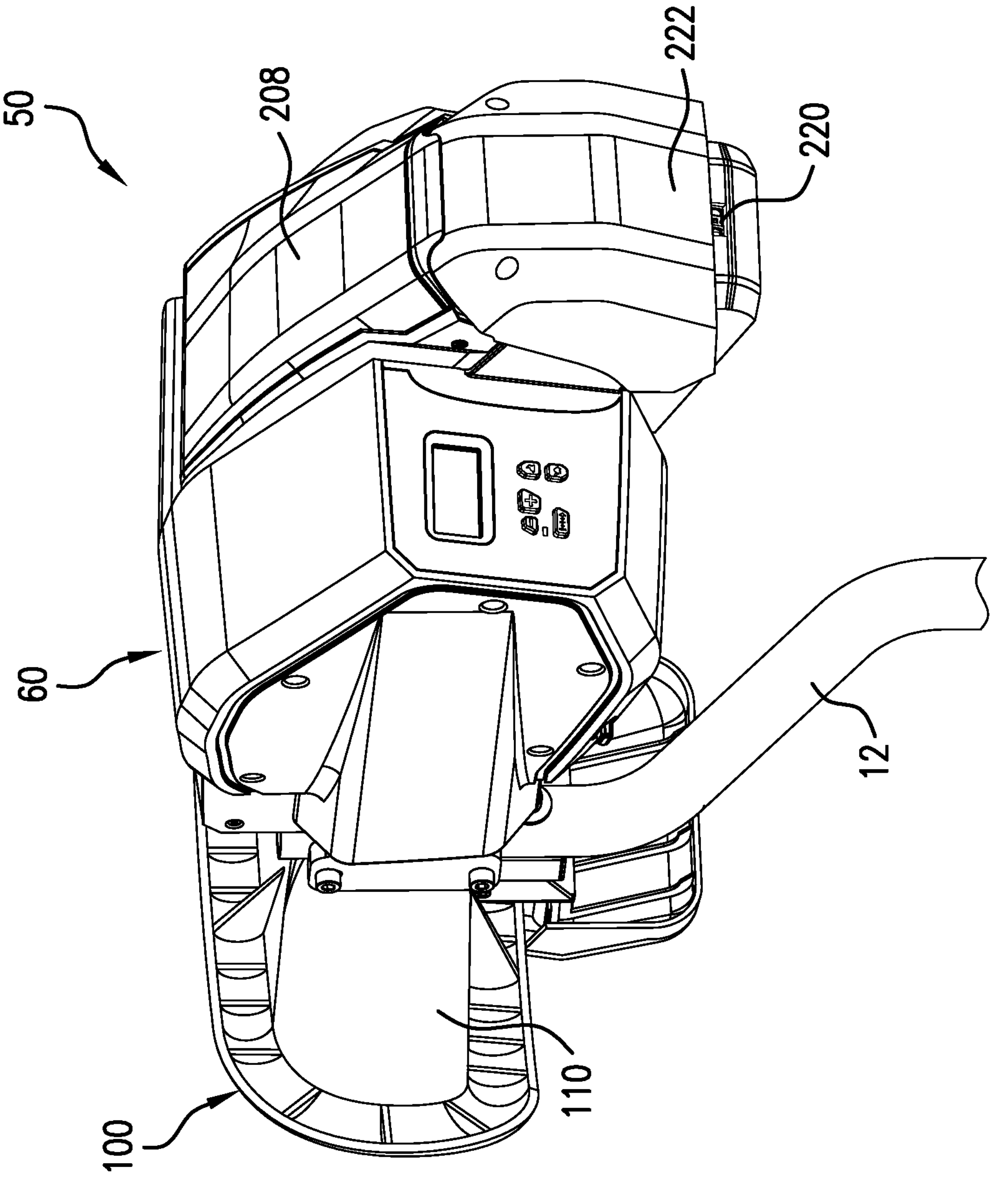
FIG. 18 is a front perspective view of the system shown in FIGS. 1-17, depicting the grip in the closed position.

The cutting mechanism 200 also includes a drive mechanism 224 mounted on the hood 208. The drive mechanism 224 is depicted in FIGS. 16 and 17. The drive mechanism 224 is configured to move the grip 222 between the open and closed positions. The drive mechanism 224 comprises a drive motor (not shown), a first sprocket 226 driven directly by the drive motor; a second sprocket 228 connected to the pin that couples the grip 222 to the hood 208; and a linkage 229 that transmits torque applied to the first sprocket 226 by the drive motor to the second sprocket 228, so that the second sprocket 228 rotates the hood 208 between the closed and open positions. This particular configuration for the drive mechanism 224 is described for illustrative purposes only. Alternative embodiments can include drive mechanisms having other configurations.

The cutting mechanism 200 also includes one or more sensors 220 mounted on the housing 204 and communicatively coupled to a controller (not shown) of the dunnage conversion machine 60. The sensors 220 can be, for example, optical sensors. Other types of sensors can be used in alternative embodiments. The sensors 220 are located proximate the freestanding end of the grip 222 when the grip 222 is in its closed position. The sensors 220 are configured to detect the presence of dunnage 15 proximate the sensors 220.

The cutting mechanism 200 further incudes one or more bumpers 230. The bumpers 230 are visible in FIGS. 4, 5, and 12. The bumpers 230 are mounted on an inwardly-facing surface of the grip 222, at or near the freestanding end of the grip 222. The bumpers 230 can be configured as a plurality of small knobs or buttons that project from the grip 222. Alternatively, the bumpers 230 can be configured as one or more elongated members oriented transversely to the material path A. The grip 222, the bumpers 230, and the housing 204 of the housing mechanism 200 are configured so that the dunnage 15 that has passed through the first roller 180 and the second roller 182 is trapped between the bumpers 230 and the adjacent surface of the housing 204 when the grip 222 is in the closed position. The bumpers 230 can be formed from a material, such as an elastomeric material, the generates a sufficient frictional force to help retain a severed piece of the dunnage 15 between the bumpers 230 and the housing 204.

The dunnage conversion machine 60 can be configured to operate in a mode in which the dunnage conversion machine 60 produces predetermined lengths of dunnage 15, with the predetermined length selected by the user. The dunnage conversion machine 60 also can operate in a mode in which the user can dispense a desired, non-predetermined length of dunnage by pressing a button or foot pedal until the desired length has been dispensed. In either operating mode, the cutting mechanism is configured to cut or sever the portion of the dunnage that has passed the blade 202. In particular, the grip 222 is in its raised position as the first roller 180 is rotated by its associated drive motor. As discussed above, the stock material 19 is drawn between the first roller 180 and the second roller 182 from the supply station 13. The folds that were formed in the stock material 19 in the intake 100 are creased as the stock material 19 passes between, and is compressed by the first roller 180 and the second roller 182.

The drive motor, in response to an input from the controller of the dunnage conversion machine 60, is deactivated once the predetermined or otherwise desired length of dunnage 15 has been dispensed, which in turn causes the first roller 180 and the second roller 182 to stop drawing stock material 19 through the dunnage conversion apparatus 60. At this point, the controller also sends an input to the drive motor of the drive mechanism 224, causing the drive motor to active. Upon activation, the drive motor rotates the grip 222 to its lowered position. When the grip 222 is in its lowered position, the bumpers 224 contact the dunnage and urge the dunnage toward the adjacent surface of the housing 204.

The controller next the issues a command to the drive motor that causes the drive motor to operate in a reverse direction, i.e., in a direction opposite the direction by which the drive motor caused the first roller 108 to draw the stock material 19 and the dunnage 15 in the direction of the material path A. The grip 222, when in its closed position, causes the dunnage 15 to wrap around the outwardly-angled blade 202. Thus, the reversal of the drive motor pulls the dunnage 15 over the cutting edge of the blade 202, severing the portion of the dunnage 15 downstream of the blade 202.

The bumpers 230 are biased toward the housing 204 by the drive mechanism 224. Thus, the severed portion of the dunnage is held in place by the bumpers 230 and the adjacent surface of the housing 204. Also, the sensors 220, which are located proximate the position at which the piece of the dunnage 15 is being held, register the presence of the dunnage 15 and generate an output that is interpreted by the controller as an indication that a piece of dunnage 15 is being held by the grip 222. The controller will not initiate, or allow the initiation of another cycle, i.e., the production of another piece of dunnage 15, until the sensors 220 indicate that the severed piece of dunnage 15 no longer is being held by the grip 222.

A user can retrieve the piece of dunnage 15 by grasping the piece and exerting a force sufficient to pull the piece from between the bumpers 230 and the housing 204. Once the piece of dunnage 15 has been removed from the field of vision of the sensors 220, the sensors 220 register the absence of the dunnage 15 and generate an output that is interpreted by the controller as an indication that the grip 222 no longer is holding a piece of dunnage 15. In response, the controller sends an input to the motor of the drive mechanism 224 that causes the motor to rotate the grip 222 to its raised position. If the dunnage conversion machine 60 is operating in a mode in which the next piece of dunnage 15 is produced automatically upon removal of the previous piece, the controller will activate the drive motor to begin the cycle of producing another piece of dunnage 15. If the dunnage conversion machine is operating in a mode in which the next piece of dunnage 15 is produced upon a receipt of a user input, the controller will initiate the next production cycle upon receipt of the user input.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or methods are in any way required for one or more implementations or that these features, elements, and/or methods are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A dunnage conversion machine, comprising:
- a drive mechanism configured to deform a stock material into a continuous length of dunnage; and
- a cutting mechanism, comprising:
  - a cutting device configured to sever a piece of the dunnage from the continuous length of dunnage;
  - a housing configured to support the cutting device; and
  - a grip configured to move between:
    - a first position in which the grip exerts a force on the piece of dunnage sufficient to hold the piece of dunnage against an adjacent surface of the housing to retain the piece of dunnage, the force being low enough to allow the piece of dunnage to be pulled from the dunnage conversion machine with the grip in the first position; and
    - a second position at which the grip releases the piece of dunnage.

2. The dunnage conversion machine of claim 1, wherein the drive mechanism comprises one or more rollers configured to deform the stock material as the material passes between the rollers.

3. The dunnage conversion machine of claim 1, wherein the cutting device comprises a blade.

4. The dunnage conversion machine of claim 1, further comprising a controller, wherein:
- the cutting mechanism further comprises:
  - a sensor communicatively coupled to the controller and configured to detect the presence of the piece of dunnage within a sensing field of the sensor, and
  - a drive mechanism communicatively coupled to the controller and configured to move the grip between the first and second positions of the grip;
- the controller is configured to generate a first output in response to removal of the piece of dunnage from the sensing field of the sensor; and
- the drive mechanism is configured to move the grip from the first position to the second position in response to the first output.

5. The dunnage conversion machine of claim 4, wherein:
- the drive mechanism further comprises at least one roller configured to feed the continuous length of dunnage to the cutting mechanism in a first direction; and
- the drive mechanism is configured to, in response to an input from the controller, reverse a direction of rotation of the at least one roller while the grip is in the first position so that the drive mechanism pulls the continuous length of dunnage in a second direction opposite the first direction, causing the cutting device to sever the piece of dunnage from the continuous length of dunnage.

6. The dunnage conversion machine of claim 5, wherein the grip is configured so that the force exerted by the grip prevents the continuous length of dunnage from moving in the second direction as the drive mechanism pulls the continuous length of dunnage in the second direction.

7. The dunnage conversion machine of claim 5, wherein:
the cutting device includes a blade; and
the grip is configured to cause the continuous length of dunnage to wrap around the blade.

8. The dunnage conversion machine of claim 4, wherein:
the controller is configured to generate a second output when the sensor detects that the piece of dunnage is within the sensing field of the sensor; and
the drive mechanism is configured to maintain the grip in the first position in response to the second input.

9. The dunnage conversion machine of claim 1, wherein the force exerted on the dunnage is sufficient to prevent the piece of dunnage from dropping from the dunnage conversion machine due to gravity.

10. The dunnage conversion machine of claim 1, wherein the cutting mechanism further comprises a bumper mounted on the grip and configured to contact and retain the piece of dunnage in response to the force exerted on the piece of dunnage.

11. The dunnage conversion machine of claim 10, wherein an outer surface of the bumper comprises a tacky material.

12. The dunnage conversion machine of claim 10, wherein the bumper comprises an elastomeric material.

13. The dunnage conversion machine of claim 10, wherein the bumper includes one or more of a knob projecting from the grip, a button projecting from the grip, and an elongated member oriented transverse to a path of the dunnage through the cutting mechanism.

14. The dunnage conversion machine of claim 1, wherein the grip is disposed and configured to hold the severed piece of dunnage at a location in the cutting assembly downstream of the blade.

15. The dunnage conversion machine of claim 1, further comprising an intake configured to feed the stock material to the dunnage conversion machine, wherein the intake comprises an inlet chute connected to the dunnage conversion machine, and a projection connected to the inlet chute, wherein the projection comprises a plurality of surface portions configured to bend the stock material as the stock material passes over the surface portions.

16. The system of claim 15, wherein the projection extends downward from an inlet end of the inlet chute.

17. The system of claim 15, wherein the projection comprises a faceted surface comprising the plurality of surface portions.

18. The system of claim 15, wherein the plurality of surface portions comprise a substantially planar upper surface portion, and outwardly curved intermediate surface portion that adjoins the upper surface portion; and a substantially planar lower surface portion that adjoins the intermediate surface portion.

19. The system of claim 18, wherein the upper surface portion is angled upwardly and in a direction of travel of the stock material into the intake; and the lower surface portion is angled downwardly and in the direction of travel of the stock material into the intake.

20. The system of claim 18, wherein:
the upper surface portion is a first upper surface portion;
the intermediate surface portion is a first intermediate surface portion;
the intermediate surface portion is a first lower surface portion; and
the plurality of surface portions further comprises:
a second upper surface portion that adjoins the first upper surface portion, the first and second upper surface portions being symmetrically disposed about a transverse centerline of the projection;
a second intermediate surface portion that adjoins the first intermediate surface portion, the first and second intermediate surface portions being symmetrically disposed about the transverse centerline of the projection; and
a second lower surface portion that adjoins the first lower surface portion, the first and second lower surface portions being symmetrically disposed about the transverse centerline of the projection.

21. The system of claim 20, wherein the plurality of surface portions further comprises:
a first and a second upper end portion each having a curved profile, the first upper end portion adjoining a first side of the projection and the first upper surface portion, the second upper end portion adjoining a second side of the projection and the second upper surface portion;
a first and a second intermediate end portion each having a curved profile, the first intermediate end portion adjoining the first side and the first intermediate surface portion, the second intermediate end portion adjoining the second side and the second intermediate surface portion;
a first and a second lower end portion each having a curved profile, the first lower end portion adjoining the first side and the first lower surface portion, the second lower end portion adjoining the second side and the second lower surface portion.

22. The dunnage conversion machine of claim 1, wherein the force is low enough to allow the piece of dunnage to be pulled from the dunnage conversion machine with the grip in the first position without tearing the piece of dunnage.

* * * * *